United States Patent
Shankar et al.

(10) Patent No.: US 12,316,266 B2
(45) Date of Patent: May 27, 2025

(54) METHODS AND APPARATUS TO DETECT A STALL OF A STEPPER MOTOR

(71) Applicant: Texas Instruments Incorporated, Dallas, TX (US)

(72) Inventors: Ganapathi Shankar, Bangalore (IN); Varun Garg, Bengaluru (IN); Venkata Naresh Kotikelapudi, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 183 days.

(21) Appl. No.: 18/204,267

(22) Filed: May 31, 2023

(65) Prior Publication Data

US 2024/0405701 A1   Dec. 5, 2024

(51) Int. Cl.
*H02P 8/38* (2006.01)

(52) U.S. Cl.
CPC ..................... *H02P 8/38* (2013.01)

(58) Field of Classification Search
CPC .... H02P 7/29; H02P 27/08; H02P 7/04; H02P 29/024; H02P 8/22; H02P 8/12; G01R 19/16547; G01R 19/16519; G01R 19/0092; G01R 1/20; H03M 1/001; H03K 5/24; H03K 17/6871; H03K 3/3565; H03K 17/687
See application file for complete search history.

(56) References Cited

U.S. PATENT DOCUMENTS

2010/0289445 A1* 11/2010 Bagarelli .................. H02P 8/22
                                                          318/696

* cited by examiner

*Primary Examiner* — Said Bouziane
(74) *Attorney, Agent, or Firm* — Mandy Barsilai Fernandez; Frank D. Cimino

(57) ABSTRACT

An example apparatus includes: memory including machine-readable instructions; programmable circuitry configured to execute the machine-readable instructions of the memory configured to: determine a first value of power transferred to a stepper motor during a first operation of the stepper motor; determine a second value of power transferred to the stepper motor during a second operation of the stepper motor; determine a load angle of power delivered by the stepper motor during the first operation and second operation of the stepper motor based on the first value, the second value, and a stall power; and compare the load angle to a stall threshold to detect a stall of the stepper motor.

20 Claims, 12 Drawing Sheets

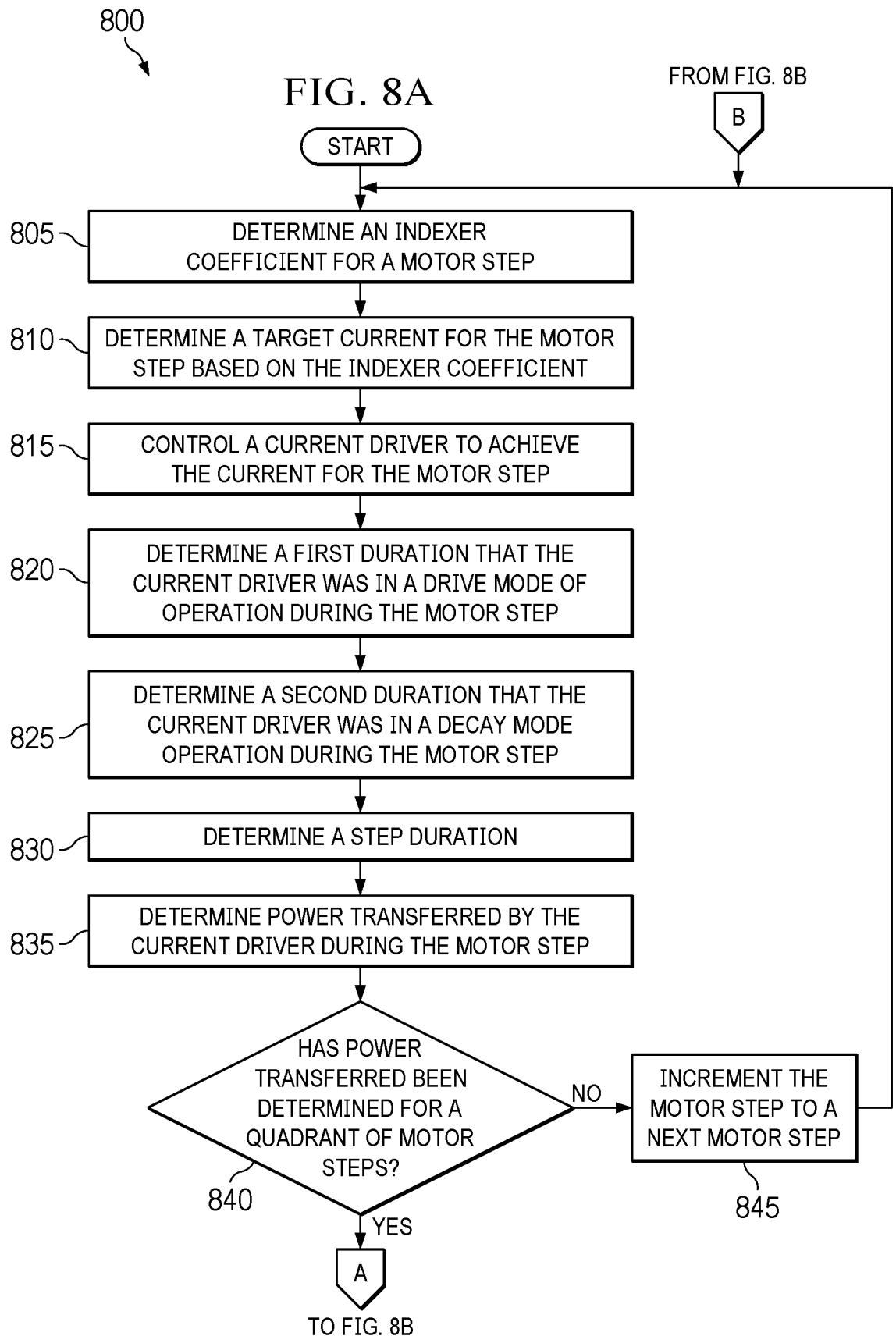

METHODS AND APPARATUS TO DETECT A STALL OF A STEPPER MOTOR

TECHNICAL FIELD

This description relates generally to motor control and, more particularly, to methods and apparatus to detect a stall of a stepper motor.

BACKGROUND

Electric motors continue to become increasingly common and complex. Electric motors convert electrical energy into mechanical energy used to drive a wide range of operations. In electric vehicle (EV) applications, mechanical energy from one or more electric motors accelerates the EV. In manufacturing applications, mechanical energy from one or more electric motors drives manufacturing operations.

SUMMARY

For methods and apparatus to detect a stall of a stepper motor, an example apparatus includes memory including machine-readable instructions; programmable circuitry configured to execute the machine-readable instructions of the memory configured to: determine a first value of power transferred to a stepper motor during a first operation of the stepper motor; determine a second value of power transferred to the stepper motor during a second operation of the stepper motor; determine a load angle of power delivered by the stepper motor during the first operation and second operation of the stepper motor based on the first value, the second value, and a stall power; and compare the load angle to a stall threshold to detect a stall of the stepper motor.

BRIEF DESCRIPTION OF THE DRAWINGS

FIGS. 8A and 8B is a flowchart representative of example machine-readable instructions and/or example operations that may be executed, instantiated, and/or performed using an example programmable circuitry and/or other hardware implementation of the controller circuitry of FIGS. 1, 2, and 6.

The same reference numbers or other reference designators are used in the drawings to designate the same or similar (functionally and/or structurally) features.

DETAILED DESCRIPTION

Figure 1:
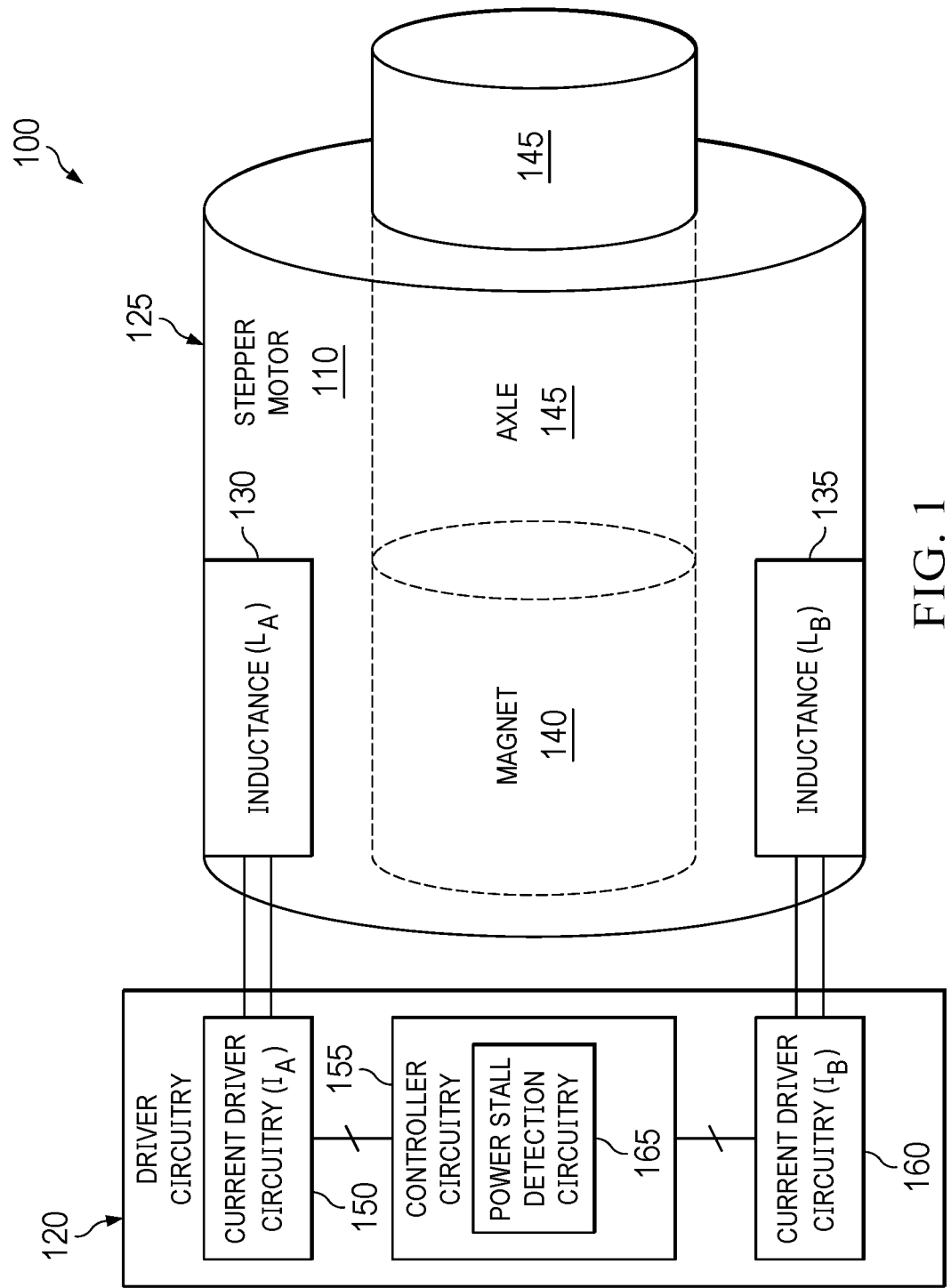
FIG. 1 is a block diagram of an example motor system including driver circuitry to supply electrical power to a stepper motor using current driver circuitry and controller circuitry.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Electric motors continue to become increasingly common and complex. Electric motors convert electrical energy into mechanical energy, such as a rotation. One type of electric motor is a stepper motor. Stepper motors include an axle, a magnet, and a plurality of inductances (e.g., coils, windings, etc.). Driver circuitry supplies currents to the stepper motors. When supplied a current, the inductances of the stepper motor rotate the axle by causing the magnet to change from a first position to a second position responsive to the current from the driver circuitry. Such a change in a positioning of the magnet is due to current flowing through the inductances creating a magnetic field that attracts and/or repels polarities of the magnet. The magnet is coupled to the axle to cause a rotation of the axle responsive to the rotation of the magnet. To accurately cause the rotation of the magnet, the driver circuitry sequences power supplied to each of the inductances.

In some applications, the driver circuitry sequences power supplied to the inductances of a stepper motor using a sinewave. In such applications, the driver circuitry supplies power to a first inductance using a first sinewave and a second inductance using a second sinewave. To sequence the rotation of the magnet, the driver circuitry generates the second sinewave as a phase shifted version of the first sinewave. Ideally, the driver circuitry supplies a continuous time sinewave to the inductances. However, driver circuitry, operating in discrete time, is incapable of generating a continuous time sinewave. Instead, driver circuitry changes an amplitude of current supplied to the inductances over a series of discrete steps. As the driver circuitry progresses through the series of steps, the changes in the amplitude of the current resemble a sinewave. Although using the series of steps is an effective alternative to supplying power as a continuous time sinewave, causing a current through an inductance to a fixed value for a set duration of a step is relatively complex.

Driver circuitry includes current driver circuitry and controller circuitry. In some applications, the driver circuitry supplies current to one of the inductances of the stepper motor based on a mode of operation of current driver circuitry. In such applications, the controller circuitry controls the mode of operation of the current driver circuitry to achieve a target current.

The current driver circuitry is capable of a drive mode of operation, a fast decay mode of operation, and a slow decay mode of operation. The controller circuitry configures the current driver circuitry to the drive mode of operation to increase current flowing through the inductor. In such a configuration, the current driver circuitry sources a current through the inductance from a voltage source. The controller circuitry keeps the current driver circuitry in the drive mode of operation until the current through the inductance is approximately equal to a target current for a given step. Once the current through the inductance is approximately equal to the target current, the controller circuitry configures the current driver circuitry to the slow decay mode of operation or the fast decay mode of operation. In the slow decay mode of operation, the current driver circuitry allows the inductance to slowly discharge current. In the fast decay mode of operation, the current driver circuitry sources a current in an opposite direction of the current being sourced during the drive mode of operation. Magnitudes of currents being sunk during the drive mode of operation and the fast decay mode of operation depend on a constant of the stepper motor and a power supply voltage of the current driver circuitry.

The current driver circuitry includes current sense circuitry to determine the current flowing through the inductance of the stepper motor. The controller circuitry determines whether to modify the mode of operation of the current driver circuitry based on the currents determined by the current sense circuitry. In some applications, the controller circuitry configures the current driver circuitry to the fast decay mode of operation to account for a decrease in the current from the target current. In such applications, the controller circuitry switches the mode of operation of the current driver circuitry to achieve the target current for a given step.

Such controller circuitry can detect a stall of the stepper motor by comparing a stall threshold to one divided by a time that the current driver circuitry is in a decay mode of operation. However, relatively small decay times at startup of the stepper motor increases complexity in setting the stall threshold and decreases an accuracy of detection. Such a method needs decay times to detect a stall, which limits stall detection in stepper motors with relatively high direct current resistance (DCR) to instances where the inductance current times the DCR is greater than a supply voltage.

Examples described herein include methods and apparatus to detect a stall of a stepper motor based on power transferred to a stepper motor. In some described examples, driver circuitry includes current driver circuitry and controller circuitry. The current driver circuitry supplies electrical power to inductances of the stepper motor. The controller circuitry configures a mode of operation of the current driver circuitry to cause a target current through the inductances of the motor. The current driver circuitry provides values representative of current through the inductance to the controller circuitry by current sense circuitry. The controller circuitry determines an indexer coefficient based on a total number of steps in a quarter cycle of the sinewave and a current step. The controller circuitry determines the target current based on the indexer coefficient and a peak current.

The controller circuitry includes power stall detection circuitry to determine if the electrical power being transferred to mechanical power by the stepper motor corresponds to a stall operation. The power stall detection circuitry determines power transferred at a step based on the supply voltage, the peak current, the indexer coefficient, a first duration, a second duration, and a third duration for each step. The first duration is an amount of time the current driver circuitry is in the drive mode of operation. The second duration is an amount of time the current driver circuitry is in the fast decay mode of operation. The third duration is a total amount of time of the step. The power stall detection circuitry determines power transferred per portion of the sinewave (e.g., a quarter wavelength, half wavelength, etc.) by summing the power transferred during each step of the portion of the sinewave. The power stall detection circuitry determines a load angle between the sinewave of the steps and a waveform generated by back electromotive force (EMF) based on the power transferred for a first and second portion of the sinewave. Advantageously, the load angle approaches a stall condition of the stepper motor as the load angle approaches zero.

FIG. 1 is a block diagram of an example motor system 100 including an example stepper motor 110 and example driver circuitry 120. The stepper motor 110 is coupled to the driver circuitry 120. The stepper motor 110 converts electrical energy into mechanical energy. The driver circuitry 120 supplies electrical power to the stepper motor 110.

In the example of FIG. 1, the stepper motor 110 includes an example housing 125, a first example inductance ($L_A$) 130, a second example inductance ($L_B$) 135, an example magnet 140, and an example axle 145. The stepper motor 110 receives electrical power from the driver circuitry 120 by the inductances 130 and 135. The stepper motor 110 converts the electrical power into mechanical energy by rotating the axle 145 using the magnet 140. Herein, the term inductance is used synonymously with the inductive element or inductor or conductor (e.g., coil, winding, etc.) characterized by the inductance.

The housing 125 encloses the inductances 130 and 135, the magnet 140, and a portion of the axle 145. The housing 125 is mechanically coupled to the inductances 130 and 135. The housing 125 includes an opening for the axle 145.

The inductances 130 and 135 are electrically coupled to the driver circuitry 120. In an operation, the inductances 130 and 135 are magnetically coupled to the magnet 140. The inductances 130 and 135 generate magnetic fields responsive to a current from the driver circuitry 120. The magnetic fields are configurable by an amount of current supplied by the driver circuitry 120 and a direction of the current.

The magnet 140 is coupled to the axle 145. The magnet 140 is rotatable around the axle 145. The magnet 140 has a north pole and a south pole (illustrated in FIG. 2). The inductances 130 and 135 may attract and/or repel poles of the magnet 140. In an example operation, magnetic fields of the inductances 130 and 135 cause a rotation of the magnet 140 and the axle 145 by attracting and repelling the poles of the magnet 140. The axle 145 may be coupled to an external system (not illustrated). For example, the axle 145 may be coupled to a wheel to accelerate a vehicle.

In the example of FIG. 1, the driver circuitry 120 includes first example current driver circuitry 150, example controller circuitry 155, and second example current driver circuitry 160. The driver circuitry 120 supplies a first current ($I_A$) and a second current ($I_B$) to the stepper motor 110.

The first current driver circuitry 150 is coupled to the first inductance 130 and the controller circuitry 155. The first current driver circuitry 150 supplies the first current to the first inductance 130. The first current driver circuitry 150 is configurable by the controller circuitry 155. The first current driver circuitry 150 may be configured to one of a drive mode of operation, a slow decay mode of operation, or a fast decay mode of operation. The drive mode of operation corresponds to configuring the first current driver circuitry 150 to increase the first current. The slow decay mode of operation corresponds to configuring the first current driver circuitry 150 to allow the first inductance 130 to discharge the first current. The fast decay mode of operation corresponds to configuring the first current driver circuitry 150 to decrease the first current. An example of the first current driver circuitry 150 is illustrated and described in further detail in FIG. 3, below.

The controller circuitry 155 is coupled to the current driver circuitries 150 and 160. In the example of FIG. 1, the controller circuitry 155 has example power stall detection circuitry 165. The controller circuitry 155 receives current measurements from the current driver circuitries 150 and 160. The controller circuitry 155 determines the first and second currents being supplied to the stepper motor 110 based on the current measurements from the current driver circuitries 150 and 160. The controller circuitry 155 determines an indexer coefficient ($K_n$) using a number identifying a step (n) and a total number of steps in a portion of a sinewave (M), such as a quadrant, half cycle, etc.

The controller circuitry 155 determines target currents ($I_n$) for the first and second currents at a step based on a peak current ($I_{PEAK}$) and the indexer coefficient. The controller circuitry 155 determines a mode of operation of the current driver circuitries 150 and 160 by comparing the target currents to the determined first and second currents. In example operation, the controller circuitry 155 modifies the mode of operation of the current driver circuitries 150 and 160 to cause the determined first and second currents to be approximately equal to the target currents. An example of the controller circuitry 155 is illustrated and described in further detail in connection with FIG. 6, below.

The power stall detection circuitry 165 determines a value of power supplied by at least one (one or both) of the current driver circuitries 150 and 160 for each step based on the supply voltage, the peak current, the indexer coefficient, a first duration ($\Sigma T_{on}$), a second duration ($\Sigma T_{fd}$), and a third duration ($\Sigma T_{step}$). The first duration is a duration of time that the controller circuitry 155 configures the first current driver circuitry 150 for a drive mode of operation for a step. The second duration is a duration of time that the controller circuitry 155 configures the first current driver circuitry 150 for a fast decay mode of operation for the step. The third duration is a duration of time of the step. The power stall detection circuitry 165 determines a total power supplied to the motor during the total number of steps in the portion of the sinewave by adding the power supplied value for each step of the plurality of steps. In some examples, the portion of the sine waveform is a quadrant (e.g., π/2, 90°, etc.). In such an example, M is the number of n steps to traverse a quadrant of the sine waveform of the currents being supplied to the stepper motor 110.

The power stall detection circuitry 165 determines the total power supplied to the stepper motor 110 during a first operation (e.g., a first quadrant of steps) and a second operation (e.g., a second quadrant of steps) of the stepper motor 110. The power stall detection circuitry 165 determines a load angle based on the power supplied during the first and second operations of the stepper motor 110 and power supplied during a reference stall condition. The load angle is a phase difference between the sinewave of the current being supplied to the stepper motor 110 and a sinewave generated by the back EMF of the stepper motor 110. In example operation, the load angle is approximately 90° (e.g., π/2) out of phase from the sinewave of the currents when the stepper motor 110 is in a no-load condition. In such example operations, the load angle begins to approach a 0° phase difference from the sinewave of the currents supplied to the stepper motor 110 in a stall condition. In some examples, the power stall detection circuitry 165 determines the stepper motor 110 is in a stall condition when the load angle is less than a stall threshold.

Advantageously, the power stall detection circuitry 165 detects a stall of the stepper motor 110 using power supplied. Advantageously, the stall threshold is configurable and independent of the reference voltage and the peak current. Advantageously, the power stall detection circuitry 165 differentiates between stall conditions and no-load conditions using the load angle. An example of the power stall detection circuitry 165 is illustrated and described in connection with FIG. 6, below.

The second current driver circuitry 160 is coupled to the second inductance 135 and the controller circuitry 155. The second current driver circuitry 160 supplies the second current to the second inductance 135. The second current driver circuitry 160 is configurable by the controller circuitry 155. The second current driver circuitry 160 may be configured to one of a drive mode of operation, a slow decay mode of operation, or a fast decay mode of operation. The drive mode of operation corresponds to configuring the second current driver circuitry 160 to increase the second current ($I_B$). The slow decay mode of operation corresponds to configuring the second current driver circuitry 160 to allow the second inductance 135 to discharge the second current ($I_B$). The fast decay mode of operation corresponds to configuring the second current driver circuitry 160 to decrease the second current ($I_B$).

Figure 2:
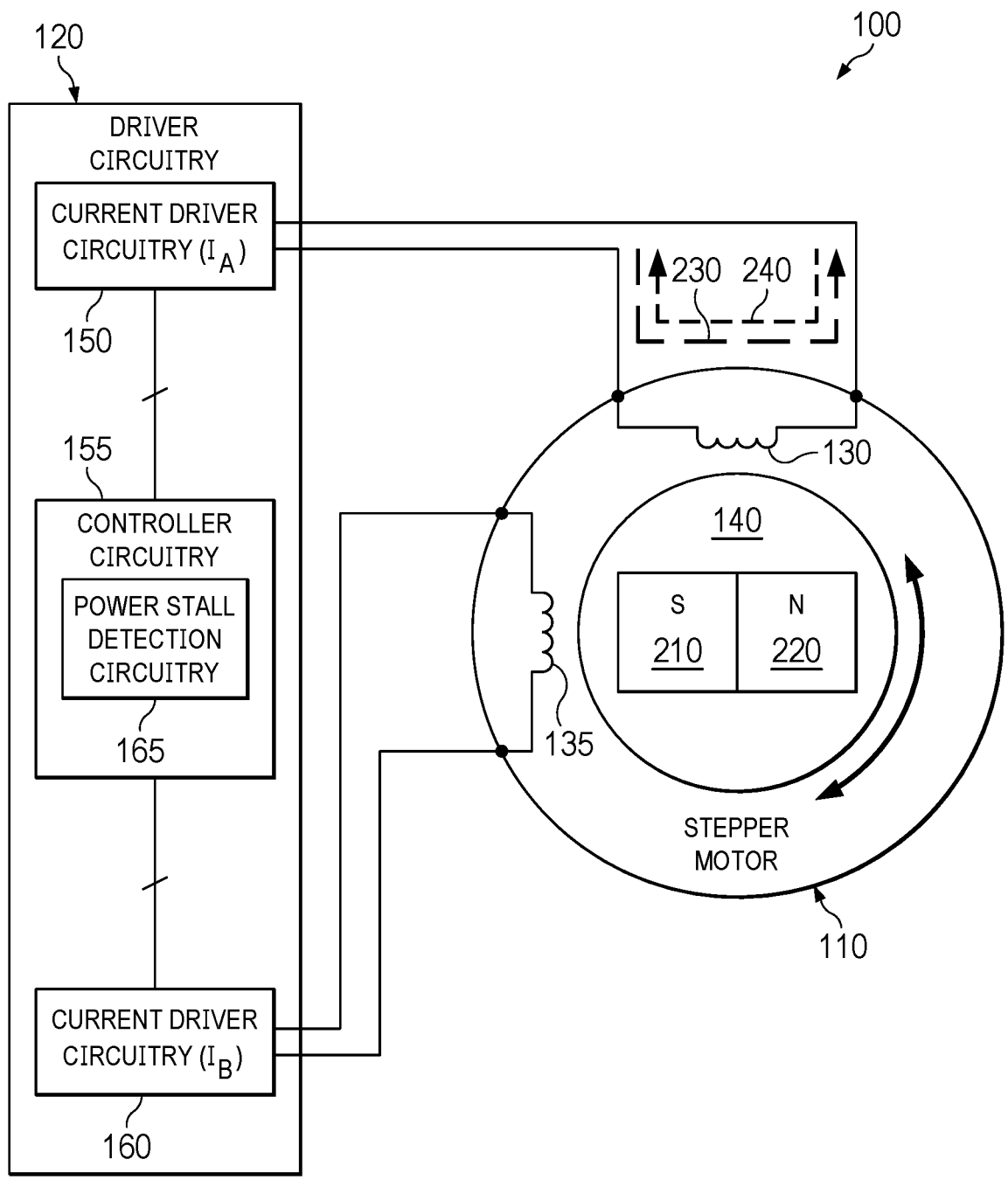
FIG. 2 is a block diagram of the example motor system of FIG. 1.

FIG. 2 is a block diagram of the example motor system 100 of FIG. 1. In the example of FIG. 2, the magnet 140 of FIG. 1 has an example south pole 210 and an example north pole 220. In an example operation, the driver circuitry 120 of FIG. 1 rotates the stepper motor 110 of FIG. 1 by supplying electrical power to the inductances 130 and 135 of FIG. 1. The inductances 130 and 135 generate magnetic fields that repel and attract the poles 210 and 220.

In an example operation, the first inductance 130 generates a first magnetic field that attracts the north pole 220 and repels the south pole 210 when the driver circuitry 120 supplies a current flowing in a first example direction 230. In such an example operation, the first inductance 130 generates a second magnetic field that repels the north pole 220 and attracts the south pole 210 when the driver circuitry 120 supplies a current flowing in a second example direction 240. The driver circuitry 120 modifies a strength of the magnetic attraction and repulsion of the poles 210 and 220 by modifying a magnitude of the first and second currents from the current driver circuitries 150 and 160 of FIG. 1.

In an example operation, the driver circuitry 120 supplies the first and second currents as out of phase sinusoidal signals with a peak current ($I_{peak}$) as the amplitude. Examples of the first and second currents are illustrated and described in FIG. 4, below. In such example operations, the first and second currents rotate the magnet 140 by attracting and repelling the poles 210 and 220. However, power loss by generating a back EMF is responsive to the rotation of the poles 210 and 220. In some examples, the back EMF is a sinusoidal waveform resembling the sinusoidal signals of the current being supplied, such as a phase shifted sinusoidal waveform. The phase difference between the first current and the back EMF is referred to as a load angle. The load angle characterizes the magnitude of the back EMF. An example of the back EMF generated by a rotation of the magnet 140 is illustrated and described in FIG. 4, below.

In an example operation, the back EMF is greatest when the stepper motor 110 rotates with minimal mechanical load. Such an operation of the stepper motor 110 is referred to as a no-load condition. In such a condition, the poles 210 and 220 freely rotate through the magnetic fields of the inductances 130 and 135. In such example operations, the power stall detection circuitry 165 determines the load angle is approximately 90°.

In another example operation, the back EMF is lowest when the stepper motor 110 does not rotate due to a mechanical load that cannot be moved. Such an operation of the stepper motor 110 is referred to as a stall condition. In such a condition, the poles 210 and 220 are unable to rotate through the magnetic fields of the inductances 130 and 135. In such example operations, the power stall detection circuitry 165 determines the load angle is approximately 0°. Advantageously, determining the load angle between the currents being supplied and the back EMF of the magnet 140, the controller circuitry 155 of FIG. 1 may determine a stall of the stepper motor 110.

Figure 3:
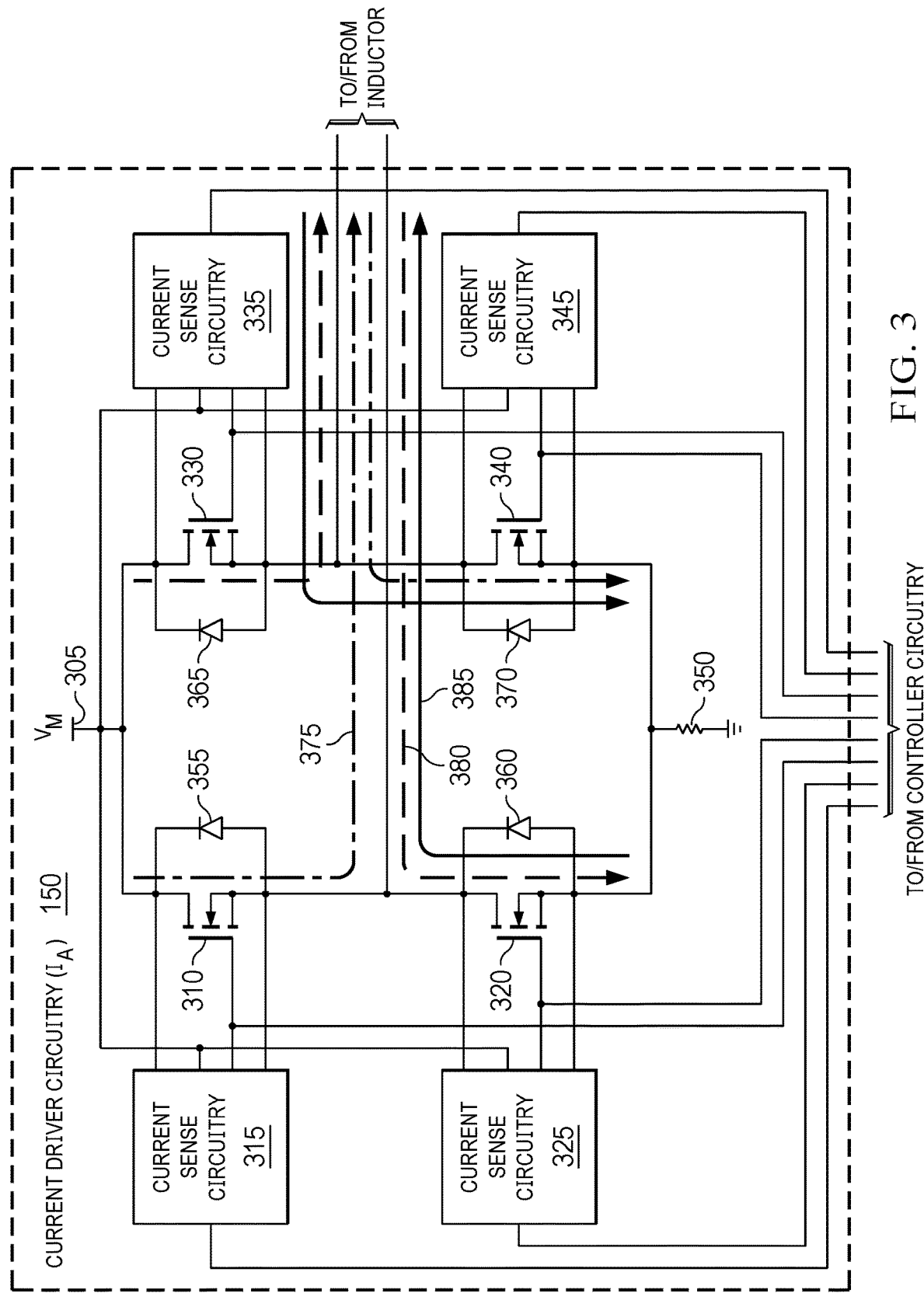
FIG. 3 is a schematic diagram of an example of the current driver circuitry of FIGS. 1 and 2.

FIG. 3 is a schematic diagram of an example of the current driver circuitries 150 and 160 of FIGS. 1 and 2. In the example of FIG. 3, the first current driver circuitry 150 includes a reference voltage terminal 305 that receives a reference voltage ($V_M$), a first example transistor 310, first example current sense circuitry 315, a second example transistor 320, second example current sense circuitry 325, a third example transistor 330, third example current sense circuitry 335, a fourth example transistor 340, fourth example current sense circuitry 345, and an example resistor 350. The reference voltage $V_M$ may be provided by a voltage supply (not shown) of the system. In the example of FIG. 3, the first current driver circuitry 150 may be referred to as the current driver circuitry 150. The current driver circuitry 150 is adaptive to be coupled to the controller circuitry 155 of FIG. 1. The current driver circuitry 150 generates a current ($I_A$).

The first transistor 310 has a drain terminal (a drain), a source terminal (a source), and a gate terminal (a gate). The drain terminal of the first transistor 310 is coupled to the reference voltage terminal 305 and the first current sense circuitry 315. The source terminal of the first transistor 310 is coupled to the first current sense circuitry 315, the second transistor 320, and adaptive to be coupled to the first inductance 130 of FIGS. 1 and 2. The gate terminal of the first transistor 310 is coupled to the first current sense circuitry 315 and adaptive to be coupled to the controller circuitry 155. The first transistor 310 has a first example body diode 355. The first body diode 355 is coupled to the drain and source terminals of the first transistor 310. The first body diode 355 is a characteristic of the first transistor 310. In some examples, the first body diode 355 may not be illustrated.

The first current sense circuitry 315 has a first input coupled to the reference voltage terminal 305. The first current sense circuitry 315 has a second input coupled to the drain terminal of the first transistor 310. The first current sense circuitry 315 has a third input coupled to the source terminal of the first transistor 310. The first current sense circuitry 315 has a fourth input coupled to the gate terminal of the first transistor 310. The first current sense circuitry 315 has an output adaptive to be coupled to the controller circuitry 155. The first current sense circuitry 315 determines a first current value representative of a magnitude of current flowing through the first transistor 310. The first current sense circuitry 315 supplies the first current value at the output of the first current sense circuitry 315. In some examples, the current sense circuitry 315, 325, 335, and/or 345 is implemented using a current sense resistor, a current sense integrated circuit, a Hall Effect sensor, or any other suitable circuitry that can measure current.

In an example operation, the controller circuitry 155 controls the first transistor 310 by controlling a gate voltage at the gate terminal of the first transistor 310. The controller circuitry 155 turns on (e.g., conducting) and turns off (e.g., non-conducting) the first transistor 310 by the gate terminal of the first transistor 310. In such an example operation, the first current sense circuitry 315 determines the first current value based on (and/or representative of) an amount of current flowing through the first transistor 310. The first current sense circuitry 315 supplies the first current value to the controller circuitry 155.

The second transistor 320 has a drain terminal, a source terminal, and a gate terminal. The drain terminal of the second transistor 320 is coupled to the first transistor 310, the second current sense circuitry 325, and adaptive to be coupled to the first inductance 130. The source terminal of the second transistor 320 is coupled to the resistor 350. The gate terminal of the second transistor 320 is coupled to the second current sense circuitry 325 and adaptive to be coupled to the controller circuitry 155. The second transistor 320 has a second example body diode 360. The second body diode 360 is coupled to the drain and source terminals of the second transistor 320. The second body diode 360 is a characteristic of the second transistor 320. In some examples, the second body diode 360 may not be illustrated.

The second current sense circuitry 325 has a first input coupled to the reference voltage terminal 305. The second current sense circuitry 325 has a second input coupled to the drain terminal of the second transistor 320. The second current sense circuitry 325 has a third input coupled to the source terminal of the second transistor 320. The second current sense circuitry 335 has a fourth input coupled to the gate terminal of the second transistor 320. The second current sense circuitry 325 has an output adaptive to be coupled to the controller circuitry 155. The second current sense circuitry 325 determines a second current value representative of a magnitude of current flowing through the second transistor 320. The second current sense circuitry 325 supplies the second current value at the output of the second current sense circuitry 325.

In an example operation, the controller circuitry 155 controls the second transistor 320 by controlling a gate voltage at the gate terminal of the second transistor 320. The controller circuitry 155 turns on (e.g., conducting) and turns off (e.g., non-conducting) the second transistor 320 by the gate terminal of the second transistor 320. In such an example operation, the second current sense circuitry 325 determines the second current value based on (and/or representative of) an amount of current flowing through the second transistor 320. The second current sense circuitry 325 supplies the second current value to the controller circuitry 155.

The third transistor 330 has a drain terminal, a source terminal, and a gate terminal. The drain terminal of the third transistor 330 is coupled to the reference voltage terminal 305 and the third current sense circuitry 335. The source terminal of the third transistor 330 is coupled to the third current sense circuitry 335, the fourth transistor 340, and adaptive to be coupled to the first inductance 130. The gate terminal of the third transistor 330 is coupled to the third current sense circuitry 335 and adaptive to be coupled to the controller circuitry 155. The third transistor 330 has a third example body diode 365. The third body diode 365 is coupled to the drain and source terminals of the third transistor 330. The third body diode 365 is a characteristic of the third transistor 330. In some examples, the third body diode 365 may not be illustrated.

The third current sense circuitry 335 has a first input coupled to the reference voltage terminal 305. The third current sense circuitry 335 has a second input coupled to the drain terminal of the third transistor 330. The third current sense circuitry 335 has a third input coupled to the source terminal of the third transistor 330. The third current sense circuitry 335 has a fourth input coupled to the gate terminal of the third transistor 330. The third current sense circuitry 335 has an output adaptive to be coupled to the controller circuitry 155. The third current sense circuitry 335 determines a third current value representative of a magnitude of current flowing through the third transistor 330. The third current sense circuitry 335 supplies the third current value at the output of the third current sense circuitry 335.

In an example operation, the controller circuitry 155 controls the third transistor 330 by controlling a gate voltage at the gate terminal of the third transistor 330. The controller circuitry 155 turns on (e.g., conducting) and turns off (e.g., non-conducting) the third transistor 330 by the gate terminal of the third transistor 330. In such an example operation, the third current sense circuitry 335 determines the third current value based on (and/or representative of) an amount of current flowing through the third transistor 330. The third current sense circuitry 335 supplies the third current value to the controller circuitry 155.

The fourth transistor 340 has a drain terminal, a source terminal, and a gate terminal. The drain terminal of the fourth transistor 340 is coupled to the third transistor 330, the fourth current sense circuitry 345, and adaptive to be coupled to the first inductance 130. The source terminal of the fourth transistor 340 is coupled to the resistor 350. The gate terminal of the fourth transistor 340 is coupled to the fourth current sense circuitry 345 and adaptive to be coupled to the controller circuitry 155. The fourth transistor 340 has a fourth example body diode 370. The fourth body diode 370 is coupled to the drain and source terminals of the fourth transistor 340. The fourth body diode 370 is a characteristic of the fourth transistor 340. In some examples, the fourth body diode 370 may not be illustrated.

The fourth current sense circuitry 345 has a first input coupled to the reference voltage terminal 305. The fourth current sense circuitry 345 has a second input coupled to the drain terminal of the fourth transistor 340. The fourth current sense circuitry 345 has a third input coupled to the source terminal of the fourth transistor 340. The second current sense circuitry 335 has a fourth input coupled to the gate terminal of the fourth transistor 340. The fourth current sense circuitry 345 has an output adaptive to be coupled to the controller circuitry 155. The fourth current sense circuitry 345 determines a fourth current value representative of a magnitude of current flowing through the fourth transistor 340. The fourth current sense circuitry 345 supplies the fourth current value at the output of the fourth current sense circuitry 345.

In an example operation, the controller circuitry 155 controls the fourth transistor 340 by controlling a gate voltage at the gate terminal of the fourth transistor 340. The controller circuitry 155 turns on (e.g., conducting) and turns off (e.g., non-conducting) the fourth transistor 340 by the gate terminal of the fourth transistor 340. In such an example operation, the fourth current sense circuitry 345 determines the fourth current value based on (and/or representative of) an amount of current flowing through the fourth transistor 340. The fourth current sense circuitry 345 supplies the fourth current value to the controller circuitry 155.

The resistor 350 has a first terminal coupled to the transistors 320 and 340. The resistor 350 has a second terminal coupled to a common terminal that provides a common potential (e.g., ground).

In example operations, the current driver circuitry 150 may be configured to one of a drive mode of operation, a fast decay mode of operation, and a slow decay mode of operation. In the drive mode of operation, the current driver circuitry 150 supplies the first current to the first inductance 130 using a first example current path 375. The first current path 375 allows current to flow from the reference voltage terminal 305 through the first transistor 310, the first inductance 130, the fourth transistor 340, and the resistor 350. In an example operation, the current driver circuitry 150 is configurable to the drive mode of operation by turning on the transistors 310 and 340 and turning off the transistors 320 and 330.

In the fast decay mode of operation, the current driver circuitry 150 supplies the first current to the first inductance 130 using a second example current path 380. The second current path 380 allows current to flow from the reference voltage terminal 305 through the third transistor 330, the first inductance 130, the second transistor 320, and the resistor 350. In an example operation, the current driver circuitry 150 is configurable to the fast decay mode of operation by turning on the transistors 320 and 330 and turning off the transistors 310 and 340.

In the slow decay mode of operation, the current driver circuitry 150 discharges the first current using a third example current path 385. The third current path 385 allows current to flow through the second transistor 320, the first inductance 130, and the fourth transistor 340. In an example operation, the current driver circuitry 150 is configurable to the slow decay mode of operation by turning on the transistors 320 and 340 and turning off the transistors 310 and 330.

In an example operation, the controller circuitry 155 modifies the mode of operation of the current driver circuitry 150 to supply the first current approximately equal to a target current. An example sequencing of modes of operation of the current driver circuitry 150 is illustrated and described in FIG. 5, below.

Figure 4:
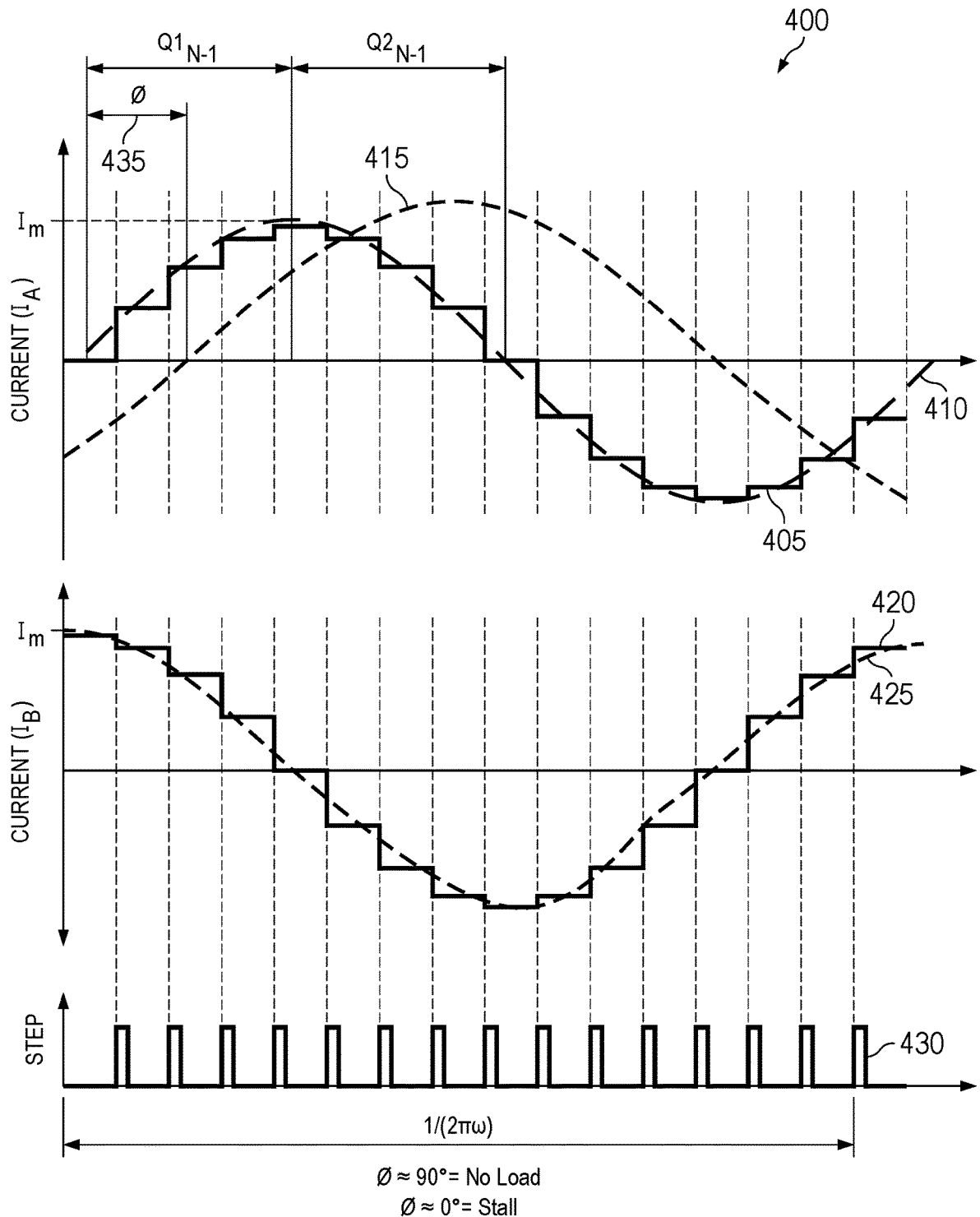
FIG. 4 is a timing diagram of an example operation of the driver circuitry of FIGS. 1 and 2.

FIG. 4 is a timing diagram 400 of an example operation of the driver circuitry 120 of FIGS. 1 and 2. In the example of FIG. 4, the timing diagram 400 illustrates first example current steps 405, a first example current 410, an example back EMF 415, second example current steps 420, a second example current 425, and example step pulse train 430 (shown as a series or sequence of pulses). The driver circuitry 120 supplies the current steps 405 and 420 to the inductances 130 and 135 of FIGS. 1 and 2. The magnet 140 of FIGS. 1 and 2 rotates the axle 145 of FIG. 1 responsive to the current steps 405 and 420.

The first current steps 405 are an approximate representation of a current from the first current driver circuitry 150 of FIGS. 1-3. The first current steps 405 represent a continuous time sinusoidal waveform using discrete time. The first current steps 405 have a plurality of steps that approximate a sinusoidal waveform represented by the first current 410. The first current driver circuitry 150 generates the first current steps 405 as an approximate representation of sinusoidal waveform of the first current 410. The first current 410 has a frequency approximately equal to one divided by 2 times pi ($\pi$) omega ($\omega$). The first current 410 represents an ideal first current from the first current driver circuitry 150.

The back EMF 415 represents the power the stepper motor 110 of FIGS. 1 and 2 converts to mechanical energy. A phase difference between the first current 410 and the back EMF 415 is an example load angle 435. A no load condition of the stepper motor 110 corresponds to the load angle 435 being approximately equal to 90°. A stall condition of the stepper motor 110 corresponds to the load angle being approximately equal to 0°. Advantageously, the load angle 435 may be used to determine a stall of the stepper motor 110.

The second current steps 420 are an approximate representation of a current from the second current driver circuitry 160 of FIGS. 1 and 2. The second current steps 420 represent a continuous time sinusoidal waveform using discrete time. The second current steps 420 have a plurality of steps that approximate a sinusoidal waveform represented by the second current 425. The second current driver circuitry 160 generates the second current steps 420 as an approximate representation of sinusoidal waveform of the second current 425. The second current 425 has a frequency approximately equal to one divided by 2 times pi ($\pi$) omega ($\omega$). The second current 425 represents an ideal second current from the second current driver circuitry 160.

In the example of FIG. 4, the currents 410 and 425 are out of phase. The phase difference between the currents 410 and 425 is based on and/or representative of the orientation of the inductances 130 and 135. The phase difference allows the poles 210 and 220 of FIG. 2 to transition from a first magnetic field of a first one of the inductances 130 or 135 to a second magnetic field of a second one of the inductances 130 or 135.

The step pulse train 430 represents timing of transitions between steps of the current steps 405 and 420. In some examples, the controller circuitry 155 increases a speed of the currents 410 and 425 by decreasing a time between pulses of the step pulse train 430. The controller circuitry 155 generates the step pulse train 430 to increment the current steps 405 and 420 to increase and/or decrease a step number to a subsequent step.

Figure 5:
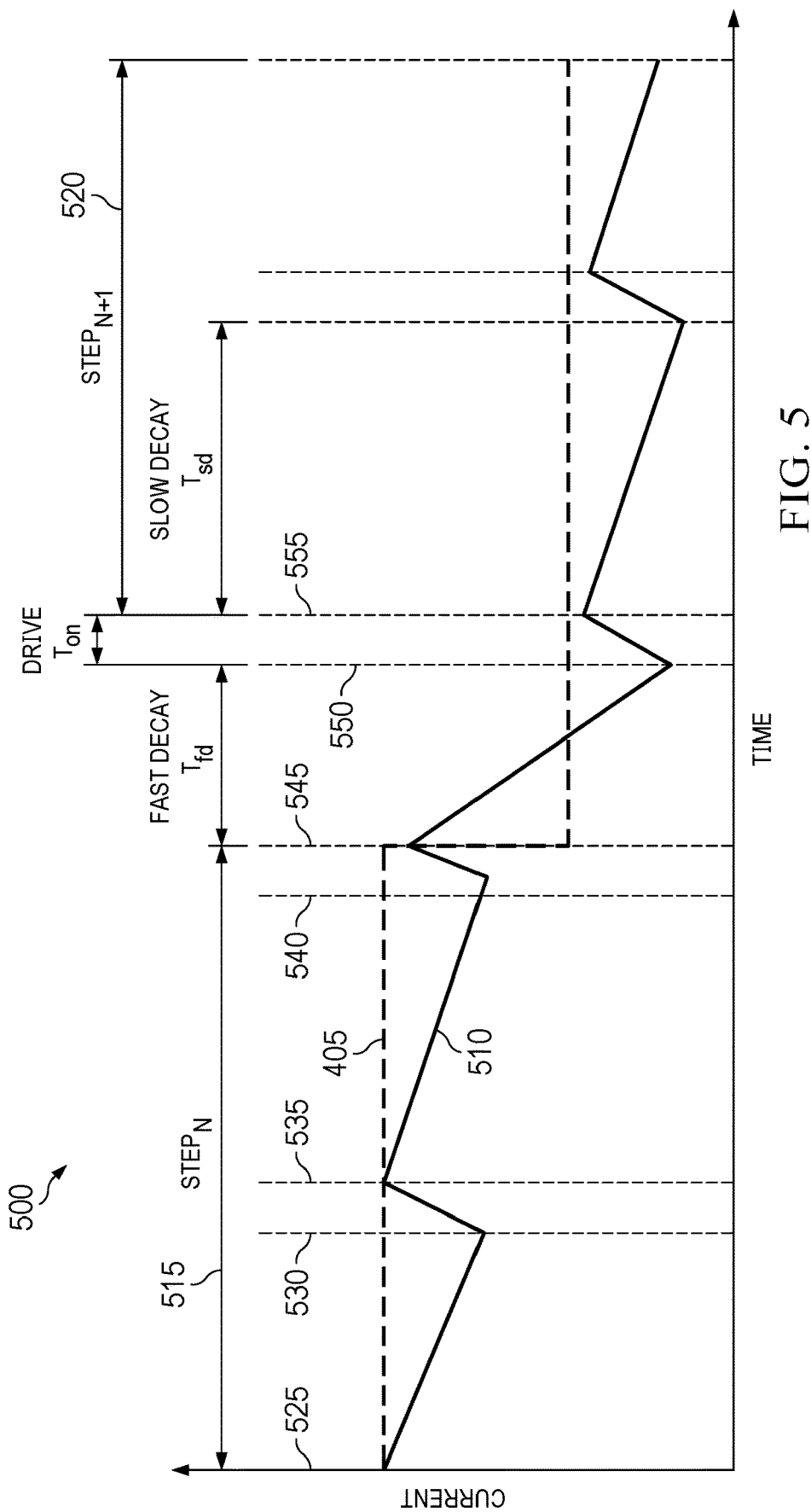
FIG. 5 is a timing diagram of an example operation of the driver circuitry of FIGS. 1 and 2.

FIG. 5 is a timing diagram 500 of an example operation of the driver circuitry 120 of FIGS. 1 and 2. In the example of FIG. 5, the timing diagram 500 includes an example portion of the first current steps 405 of FIG. 4 and an example driver current output 510. The portion of the first current step 405 illustrated in FIG. 5 includes a first example step ($STEP_N$) 515 and a second example step ($STEP_{N+1}$) 520.

The driver current output 510 represents a current at the output of the first current driver circuitry 150 of FIGS. 1-3. During the first step 515, the controller circuitry 155 of FIGS. 1 and 2 configures the mode of operation of the first current driver circuitry 150 based on a first magnitude of the first current steps 405 at the first step 515. During the second step 520, the controller circuitry 155 configures the mode of operation of the first current driver circuitry 150 based on a second magnitude of the first current steps 405 at the second step 520.

At a first time 525, the controller circuitry 155 configures the first current driver circuitry 150 to the slow decay mode of operation. In some examples, the slow decay mode of operation corresponds to the third current path 385 of FIG. 3. In the slow decay mode of operation, the driver current output 510 decreases relatively slowly.

At a second time 530, the controller circuitry 155 detects that the driver current output 510 has decreased by a threshold amount. At the second time 530, the controller circuitry 155 configures the first current driver circuitry 150 to the drive mode of operation. In some examples, the drive mode of operation corresponds to the first current path 375 of FIG. 3. In the drive mode of operation, the driver current output 510 increases relatively quickly.

At a third time 535, the controller circuitry 155 detects that the driver current output 510 is approximately equal to the first current steps 405. At the third time 535, the controller circuitry 155 configures the first current driver circuitry 150 to the slow decay mode of operation. Following the third time 535, the driver current output 510 decreases relatively slowly.

At a fourth time 540, the controller circuitry 155 detects that the driver current output 510 has decreased by the threshold amount. At the fourth time 540, the controller circuitry 155 configures the first current driver circuitry 150 to the drive mode of operation. In the drive mode of operation, the driver current output 510 increases relatively quickly.

At a fifth time 545, the controller circuitry 155 detects the transition from the first step 515 to the second step 520. At the fifth time 545, the controller circuitry 155 configures the first current driver circuitry 150 to the fast decay mode of operation. In some examples, the fast decay mode of operation corresponds to the second current path 380 of FIG. 3. In the fast decay mode of operation, the driver current output 510 decreases relatively quickly. Advantageously, the fast decay mode of operation enables the first current driver circuitry 150 to modify the driver current output 510 faster than the slow decay mode of operation.

At a sixth time 550, the controller circuitry 155 detects that the driver current output 510 has decreased by the threshold amount less than the first current steps 405. At the sixth time 550, the controller circuitry 155 configures the first current driver circuitry 150 to the drive mode of operation. In the drive mode of operation, the driver current output 510 increases relatively quickly.

At a seventh time 555, the controller circuitry 155 detects that the driver current output 510 is approximately equal to the first current steps 405 during the second step 520. At the seventh time 555, the controller circuitry 155 configures the first current driver circuitry 150 to the slow decay mode of operation. Following the seventh time 555, the driver current output 510 decreases relatively slowly. Advantageously, the controller circuitry 155 may use the different modes of operation of the current driver circuitries 150 and 160 of FIGS. 1-3 to generate the current steps 405 and 420 of FIG. 4.

Figure 6:
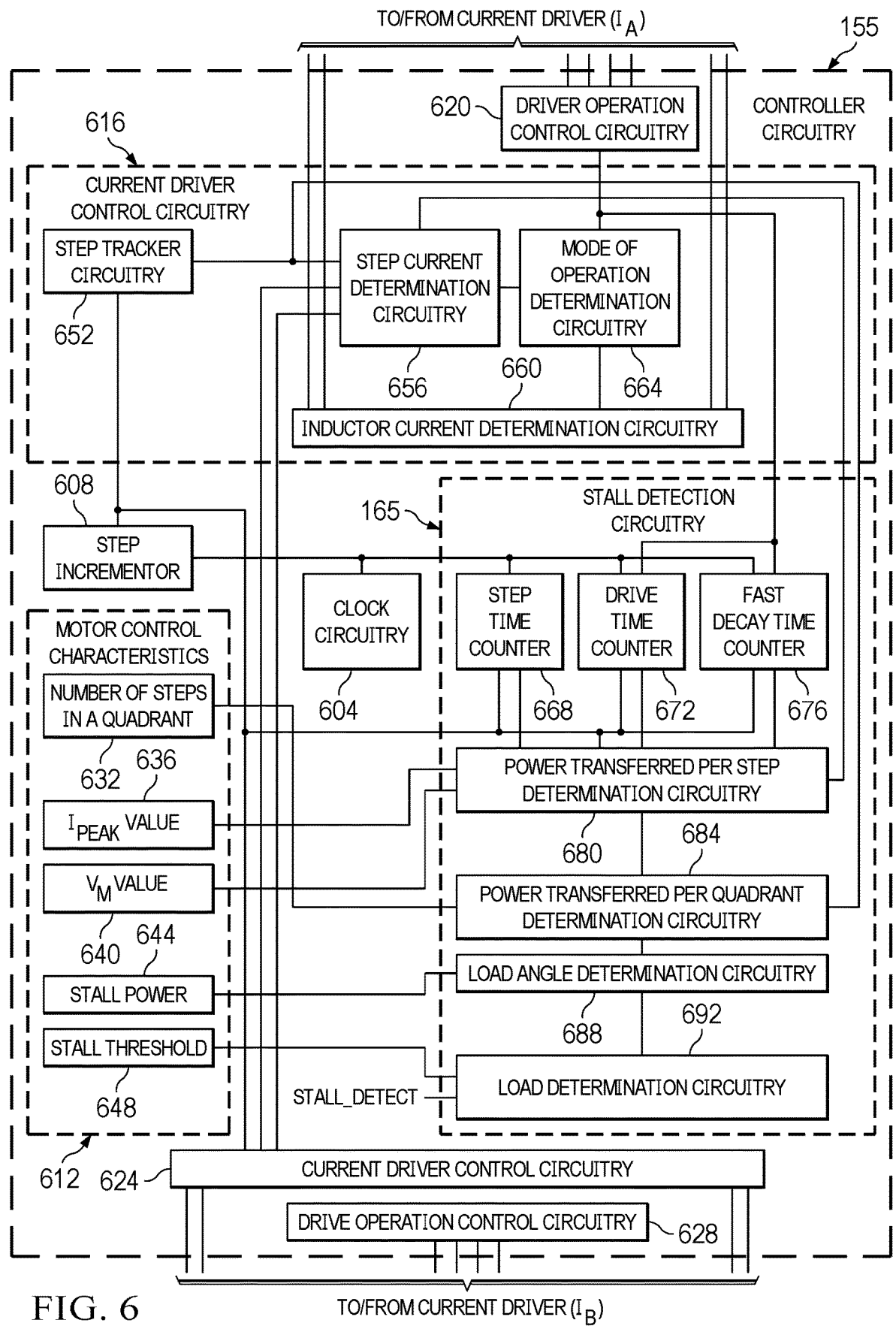
FIG. 6 is a block diagram of an example of the controller circuitry of FIGS. 1 and 2 in which example power stall detection circuitry operates to detect a stall of the stepper motor of FIGS. 1 and 2.

FIG. 6 is a block diagram of an example implementation of the controller circuitry 155 of FIGS. 1 and 2 to detect stall operation of the stepper motor 110 of FIGS. 1 and 2. The controller circuitry 155 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the controller circuitry 155 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Accordingly, all of the controller circuitry 155 of FIG. 6 may be instantiated at the same or different times. Some or all of the controller circuitry 155 of FIG. 6 may be instantiated, for example, in one or more threads executing concurrently on hardware and/or in series on hardware. Moreover, in some examples, some or all of the controller circuitry 155 of FIG. 6 is implemented by microprocessor circuitry executing instructions and/or FPGA circuitry performing operations to implement one or more virtual machines and/or containers.

In the example of FIG. 6, the controller circuitry 155 includes the power stall detection circuitry 165 of FIGS. 1 and 2, example clock circuitry 604, an example step incrementor 608, example motor control characteristics 612, first example current driver control circuitry 616, first example drive operation control circuitry 620, second example current driver control circuitry 624, and second example drive operation control circuitry 628. The controller circuitry 155 controls the mode of operation of the current driver circuitries 150 and 160 of FIGS. 1-3 based on the drive operation control circuitries 620 and 628. The power stall detection circuitry 165 of the controller circuitry 155 detects a stall of the stepper motor 110 of FIGS. 1 and 2.

The clock circuitry 604 is coupled to the power stall detection circuitry 165 and the step incrementor 608. The clock circuitry 604 generates a reference clock. The clock circuitry 604 supplies the reference clock to the power stall detection circuitry 165 and the step incrementor 608. In some examples, the controller circuitry 155 may receive the reference clock from an external clock source, such as a crystal oscillator, a resistor-capacitor oscillator, etc.

The step incrementor 608 has a first input coupled to the clock circuitry 604. The step incrementor 608 has a second input coupled to the current driver control circuitries 616 and 624. The step incrementor 608 generates a step pulse train (e.g., the step pulse train 430 of FIG. 4) based on the reference clock from the clock circuitry 604. The step incrementor 608 supplies the step pulse train to the current driver control circuitries 616 and 624. In some examples, the step incrementor 608 is instantiated by processor circuitry executing step incrementor instructions and/or other circuitry performing operations such as those represented by the flowchart of FIGS. 8A and 8B.

The motor control characteristics 612 is coupled to the power stall detection circuitry 165 and the current driver control circuitries 616 and 624. In the example of FIG. 6, the motor control characteristics 612 includes an example number of steps in a quadrant value 632, an example peak current value 636, an example reference voltage value 640, an example stall power values 644, and an example stall threshold value 648. In some examples, the motor control characteristics 612 may be implemented as a memory, such as one or more registers, volatile memory, non-volatile memory, etc. In other examples, the motor control characteristics 612 may receive the values 632-648 from an external data source, such as a main memory, processor circuitry, etc.

The number of steps in a quadrant value 632 represents a number of steps (e.g., the steps 515 and 520 of FIG. 5) within a quadrant of the sinusoidal waveform of the first current 410 of FIG. 4. For example, the number of steps in a quadrant value 632 is the number of steps in approximately one divided by eight times pi ($\pi$) and omega ($\omega$). The peak current value 636 represents an amplitude of the first current 410. Also, during an example operation, the peak current value 636 is the maximum current of the currents from the driver circuitry 120 of FIGS. 1 and 2. The reference voltage value 640 represents a voltage of the reference voltage ($V_M$) 305 of FIG. 3. The stall power values 644 are reference values of power calculations when the stepper motor 110 is in a stall condition. The stall threshold value 648 represents a threshold value of the load angle 435 of FIG. 4, that identifies a stall condition. For example, the controller circuitry 155 determines the stepper motor 110 is in the stall condition when the load angle 435 is less than and/or equal to the stall threshold value 648.

The motor control characteristics 612 supplies the values 632 and 636 to the current driver control circuitries 616 and 624. The motor control characteristics 612 supplies the values 632-648 to the stall detection circuitries 165.

The first current driver control circuitry 616 may be coupled to the current sense circuitries 315, 325, 335, and 345 of the first current driver circuitry 150 of FIGS. 1-3. The first current driver control circuitry 616 is coupled to the power stall detection circuitry 165, the step incrementor 608, the motor control characteristics 612, and the first drive operation control circuitry 620. In the example of FIG. 6, the first current driver control circuitry 616 includes example step tracker circuitry 652, example step current determination circuitry 656, example inductor current determination circuitry 660, and example mode of operation determination circuitry 664.

The first current driver control circuitry 616 determines a current for a given step based on the step tracker circuitry 652 and the step current determination circuitry 656. The first current driver control circuitry 616 determines the first current based on the inductor current determination circuitry 660. The first current driver control circuitry 616 determines the mode of operation of the first current driver circuitry 150 based on the mode of operation determination circuitry 664. In some examples, the first current driver control circuitry 616 is instantiated by processor circuitry executing current driver control instructions and/or other circuitry performing operations such as those represented by the flowchart of FIGS. 8A and 8B.

The step tracker circuitry 652 has an input coupled to the step incrementor 608. The step tracker circuitry 652 has an output coupled to the power stall detection circuitry 165 and the step current determination circuitry 656. The step tracker circuitry 652 tracks a current step of operation of the first current steps 405 of FIG. 4. The step tracker circuitry 652 increments the current step by one after each pulse of the step pulse train from the step incrementor 608. The step tracker circuitry 652 supplies a value representative of the current step to the power stall detection circuitry 165 and the step current determination circuitry 656. In some examples, the step tracker circuitry 652 is instantiated by processor circuitry executing step tracking instructions and/or other circuitry performing operations such as those represented by the flowchart of FIGS. 8A and 8B.

The step current determination circuitry 656 has a first input coupled to the number of steps in a quadrant value 632 of the motor control characteristics 612. The step current determination circuitry 656 has a second input coupled to the peak current value 636 of the motor control characteristics 612. The step current determination circuitry 656 has a third input coupled to step tracker circuitry 652. The step current determination circuitry 656 receives the value representative of the current step (n), the number of steps in a quadrant value (M) 632, and the peak current value ($I_{PEAK}$) 636 as inputs.

The step current determination circuitry 656 determines an indexer coefficient ($K_n$) for the current step. The indexer coefficient is a value representative of a portion of the sinewave of the current (e.g., the currents 410 and 425 of FIG. 4) corresponding to the current step. The step current determination circuitry 656 determines the indexer coefficient based on the value representative of the current step (n) and the number of steps in a quadrant value (M) 632. In some examples, the step current determination circuitry 656 determines the indexer coefficient by taking the sine of ninety divided by the number of steps in a quadrant value 632 times the value of the current step. In such examples, the step current determination circuitry 656 uses Equation (1), below, to determine the indexer coefficient.

$$K_n = \sin((90°/M) * n);  \quad \text{Equation (1)}$$

The step current determination circuitry 656 determines a target step current ($I_n$) based on the peak current value 636 and the indexer coefficient from Equation (1), above. The target step current is a target current during the current step (e.g., one of the steps of the current steps 405 and/or 420). In some examples, the step current determination circuitry 656 determines step current by multiplying the peak current value 636 by the indexer coefficient. In such examples the step current determination circuitry 656 uses Equation (2), below, to determine the step current.

$$I_n = I_{peak} * K_n \quad \text{Equation (2)}$$

The step current determination circuitry 656 has a first output coupled to the power stall detection circuitry 165. The step current determination circuitry 656 has a second output coupled to the mode of operation determination circuitry 664. The step current determination circuitry 656 supplies the indexer coefficient to the power stall detection circuitry 165. The step current determination circuitry 656 supplies the target step current to the mode of operation determination circuitry 664. In some examples, the step current determination circuitry 656 is instantiated by processor circuitry executing step current determination instructions and/or other circuitry performing operations such as those represented by the flowchart of FIGS. 8A and 8B.

The inductor current determination circuitry 660 has inputs coupled to the first current driver circuitry 150. The inductor current determination circuitry 660 receives current values from the current sense circuitries 315, 325, 335, and 345 of FIG. 3 of the first current driver circuitry 150. The inductor current determination circuitry 660 determines a value of the first current based on the current values from the first current driver circuitry 150. For example, in the drive mode of operation, the inductor current determination circuitry 660 determines the first current based on the current values of the current sense circuitries 315 and 345. The inductor current determination circuitry 660 has an output coupled to the mode of operation determination circuitry 664. The inductor current determination circuitry 660 supplies the determined first current to the mode of operation determination circuitry 664. In some examples, the inductor current determination circuitry 660 is instantiated by processor circuitry executing inductor current determination instructions and/or other circuitry performing operations such as those represented by the flowchart of FIGS. 8A and 8B.

The mode of operation determination circuitry 664 has a first input coupled to the step current determination circuitry 656. The mode of operation determination circuitry 664 has a second input coupled to the inductor current determination circuitry 660. The mode of operation determination circuitry 664 receives the target step current from the step current determination circuitry 656. The mode of operation determination circuitry 664 receives the determined first current from the inductor current determination circuitry 660. The mode of operation determination circuitry 664 compares the target step current to the determined first current. The mode of operation determination circuitry 664 selects one of the drive mode of operation, the fast decay mode of operation, or the slow decay mode of operation based on the comparison.

In an example operation, the mode of operation determination circuitry 664 selects the drive mode of operation when a difference between the determined first current and the target step current is greater than a threshold. For example, the mode of operation determination circuitry 664 selects the drive mode of operation at the times 530, 540, and 550 of FIG. 5. Advantageously, the drive mode of operation decreases the difference between the determined first current and the target step current.

In another example operation, the mode of operation determination circuitry 664 selects the slow decay mode of operation when the determined first current is approximately equal to the target step current. For example, the mode of operation determination circuitry 664 selects the slow decay mode of operation at the times 525, 535, and 555 of FIG. 5. In some examples, the mode of operation determination circuitry 664 may select the slow decay mode of operation when a difference between the target step current and the determined first current is greater than a threshold.

In yet another example operation, the mode of operation determination circuitry 664 selects the fast decay mode of operation when the step tracker circuitry 652 increments to a subsequent step. In such an example operation, the step current determination circuitry 656 determines a subsequent target step current responsive to the step tracker circuitry 652. For example, the mode of operation determination circuitry 664 selects the fast decay mode of operation at the fifth time 545 of FIG. 5.

The mode of operation determination circuitry 664 has an output coupled to the power stall detection circuitry 165 and the first drive operation control circuitry 620. The mode of operation determination circuitry 664 supplies the selected mode of operation to the first drive operation control circuitry 620. In some examples, the mode of operation determination circuitry 664 is instantiated by processor circuitry executing mode of operation determination instructions and/or other circuitry performing operations such as those represented by the flowchart of FIGS. 8A and 8B.

The first driver operation control circuitry 620 has an input coupled to the first current driver control circuitry 616. The first driver operation control circuitry 620 has outputs that may be coupled to the first current driver circuitry 150. The first drive operation control circuitry 620 receives the selected mode of operation from the mode of operation determination circuitry 664. The first drive operation control circuitry 620 configures the first current driver circuitry 150 based on the selected mode of operation. In some examples, the first drive operation control circuitry 620 turns on and/or turns off the transistors 310, 320, 330, and/or 340 of FIG. 3 to configure the first current driver circuitry 150 to the selected mode of operation. In some examples, the first drive operation control circuitry 620 is instantiated by processor circuitry executing driver operation control instructions and/or other circuitry performing operations such as those represented by the flowchart of FIGS. 8A and 8B.

The second current driver control circuitry 624 is may be coupled to the second current driver circuitry 160 of FIGS. 1 and 2. The second current driver control circuitry 624 is coupled to the step incrementor 608, the motor control characteristics 612, and the second drive operation control circuitry 628. The second current driver control circuitry 624 determines a target current for a given step. The second current driver control circuitry 624 determines the second current of the second current driver circuitry 160. The second current driver control circuitry 624 determines the mode of operation of the second current driver circuitry 160. Similar to the first current driver control circuitry 616, the second current driver control circuitry 624 selects a mode of operation of the second drive operation control circuitry 628. In some examples, the second current driver control circuitry 624 is instantiated by processor circuitry executing current driver control instructions and/or other circuitry performing operations such as those represented by the flowchart of FIGS. 8A and 8B.

The second drive operation control circuitry 628 has an input coupled to the second current driver control circuitry 624. The second drive operation control circuitry 628 has outputs that may be coupled to the second current driver circuitry 160. The second drive operation control circuitry 628 receives the selected mode of operation from the second current driver control circuitry 624. The second drive operation control circuitry 628 configures the second current driver circuitry 160 based on the selected mode of operation. In some examples, the second drive operation control circuitry 628 configures the second current driver circuitry 160 to the selected mode of operation. In some examples, the second drive operation control circuitry 628 is instantiated by processor circuitry executing driver operation control instructions and/or other circuitry performing operations such as those represented by the flowchart of FIGS. 8A and 8B.

The power stall detection circuitry 165 is coupled to the clock circuitry 604, the step incrementor 608, the motor control characteristics 612, and the first current driver control circuitry 616. In the example of FIG. 6, the power stall detection circuitry 165 includes an example step time counter 668, an example drive time counter 672, an example fast decay time counter 676, example power transferred per step determination circuitry 680, example power transferred per quadrant determination circuitry 684, example load angle determination circuitry 688, and example load determination circuitry 692. The power stall detection circuitry 165 determines the power supplied to the stepper motor 110. The power stall detection circuitry 165 determines the load angle 435 of FIG. 4 based on the power supplied to the stepper motor 110. The power stall detection circuitry 165 detects a stall operation of the stepper motor 110 based on the load angle 435.

The step time counter 668 has a first input coupled to the clock circuitry 604. The step time counter 668 has a second input coupled to the step incrementor 608. The step time counter 668 receives the reference clock from the clock circuitry 604. The step time counter 668 receives the step pulse train from the step incrementor 608. The step time counter 668 determines a duration of a step based on the reference clock and the step pulse train. In some examples, the step time counter 668 counts a number of cycles of the reference clock between rising edges of the step pulse train. In such examples, the number of cycles of the reference clock represents the duration of the step. The step time counter 668 has an output coupled to the power transferred per step determination circuitry 680. The step time counter 668 supplies the duration of the step to the power transferred per step determination circuitry 680.

The drive time counter 672 has a first input coupled to the clock circuitry 604. The drive time counter 672 has a second input coupled to the step incrementor 608. The drive time counter 672 has a third input coupled to the first current driver control circuitry 616. The drive time counter 672 receives the reference clock from the clock circuitry 604. The drive time counter 672 receives the step pulse train from the step incrementor 608. The drive time counter 672 receives the selected mode of operation from the mode of operation determination circuitry 664 of the first current driver control circuitry 616.

The drive time counter 672 determines a duration that the first current driver circuitry 150 is in the drive mode of operation during a step. The drive time counter 672 determines the duration the mode of operation is the drive mode of operation between rising edges of the step pulse train. In some examples, the drive time counter 672 counts a number of cycles of the reference clock between rising edges of the step pulse train when the selected mode of operation is the drive mode of operation. In such examples, the number of cycles of the reference clock represents the duration that the first current driver circuitry 150 is configured for the drive mode of operation. The drive time counter 672 has an output coupled to the power transferred per step determination circuitry 680. The drive time counter 672 supplies the duration of the drive mode of operation for the step to the power transferred per step determination circuitry 680.

The fast decay time counter 676 has a first input coupled to the clock circuitry 604. The fast decay time counter 676 has a second input coupled to the step incrementor 608. The fast decay time counter 676 has a third input coupled to the first current driver control circuitry 616. The fast decay time counter 676 receives the reference clock from the clock circuitry 604. The fast decay time counter 676 receives the step pulse train from the step incrementor 608. The fast decay time counter 676 receives the selected mode of operation from the mode of operation determination circuitry 664 of the first current driver control circuitry 616.

The fast decay time counter 676 determines a duration that the first current driver circuitry 150 is in the fast decay mode of operation during a step. The fast decay time counter 676 determines the duration the mode of operation is the fast decay mode of operation between rising edges of the step pulse train. In some examples, the fast decay time counter 676 counts a number of cycles of the reference clock between rising edges of the step pulse train when the selected mode of operation is the fast decay mode of operation. In such examples, the number of cycles of the reference clock represents the duration that the first current driver circuitry 150 is configured for the fast decay mode of operation. The fast decay time counter 676 has an output coupled to the power transferred per step determination circuitry 680. The fast decay time counter 676 supplies the duration of the fast decay mode of operation for the step to the power transferred per step determination circuitry 680.

The power transferred per step determination circuitry 680 has inputs coupled to step incrementor 608, the motor control characteristics 612, the first current driver control circuitry 616, and the counters 668-676. The power transferred per step determination circuitry 680 receives the step pulse train from the step incrementor 608. The power transferred per step determination circuitry 680 receives the peak current value ($I_{PEAK}$) 636 and the reference voltage value ($V_m$) 640 from the motor control characteristics 612. The power transferred per step determination circuitry 680 receives the indexer coefficient ($K_n$) from the step current determination circuitry 656 of the first current driver control circuitry 616. The power transferred per step determination circuitry 680 receives the duration of the step ($T_{step}$), the duration of the drive mode of operation for the step ($\Sigma T_{on}$), and the duration of the fast decay mode of operation for the step ($\Sigma T_{fd}$) from the counters 668-676.

The power transferred per step determination circuitry 680 determines the power transferred to the stepper motor 110 during a step ($Q_n$) based on the peak current value 636, the reference voltage value 640, the indexer coefficient, the duration of the drive mode of operation for the step, the duration of the fast decay mode of operation for the step, and the duration of the step. In some examples, the power transferred per step determination circuitry 680 determines the power transferred to the stepper motor 110 during a step as a multiplication of the reference voltage value 640, the peak current 363, the indexer coefficient, and a division of the duration of the drive mode of operation for the step minus the duration of the fast decay mode of operation for the step by the duration of the step. In such examples, the power transferred per step determination circuitry 680 uses Equation (3), below, to determine the power transferred to the stepper motor 110 during a step.

$$Q_n = V_m * I_{PEAK} * K_n * (\Sigma T_{on} - \Sigma T_{fd})/T_{step}); \quad \text{Equation (3)}$$

The power transferred per step determination circuitry 680 has an output coupled to the power transferred per quadrant determination circuitry 684. The power transferred per step determination circuitry 680 supplies the determined power transferred to the stepper motor 110 during a step to the power transferred per quadrant determination circuitry 684. In some examples, the power transferred per step determination circuitry 680 is instantiated by processor circuitry executing power transferred per step determination instructions and/or other circuitry performing operations such as those represented by the flowchart of FIGS. 8A and 8B.

The power transferred per quadrant determination circuitry 684 has inputs coupled to the motor control characteristics 612, the first current driver control circuitry 616, and the power transferred per step determination circuitry 680. The power transferred per quadrant determination circuitry 684 receives the number of steps in a quadrant value (M) 632 from the motor control characteristics 612. The power transferred per quadrant determination circuitry 684 receives the value representative of the current step (n) from the step tracker circuitry 652 of the first current driver control circuitry 616. The power transferred per quadrant determination circuitry 684 receives the power transferred per step from the power transferred per step determination circuitry 680.

The power transferred per quadrant determination circuitry 684 determines the power transferred to the stepper motor 110 during a quadrant of steps ($Q_{M:0}$) based on the number of steps in a quadrant value 632 and the power transferred per step for steps comprising a quadrant of the first current 410 of FIG. 4. In some examples, the power transferred per quadrant determination circuitry 684 determines the power transferred to the stepper motor 110 during a quadrant of steps as a summation of the power transferred power per step for steps of a quadrant. In such examples, the power transferred per quadrant determination circuitry 684 uses Equation (4), below, to determine the power transferred to the stepper motor 110 during a quadrant of steps.

$$Q_{M:0} = \sum_{n=0}^{M} Q_n; \quad \text{Equation (4)}$$

The power transferred per quadrant determination circuitry 684 has an output coupled to the load angle determination circuitry 688. The power transferred per quadrant determination circuitry 684 supplies the determined power transferred to the stepper motor 110 during a quadrant of steps to the load angle determination circuitry 688. In some examples, the power transferred per quadrant determination circuitry 684 is instantiated by processor circuitry executing power transferred per quadrant determination instructions and/or other circuitry performing operations such as those represented by the flowchart of FIGS. 8A and 8B.

The load angle determination circuitry 688 has inputs coupled to the motor control characteristics 612 and the power transferred per quadrant determination circuitry 684. The load angle determination circuitry 688 receives the stall power values 644 from the motor control characteristics 612. The load angle determination circuitry 688 receives the power transferred per quadrant of steps from the power transferred per quadrant determination circuitry 684.

The load angle determination circuitry 688 determines the load angle 435 of FIG. 4 based on a first quadrant stall power ($Q_{1\_STALL}$), a second quadrant stall power ($Q_{2\_STALL}$), first power transferred per quadrant of steps ($Q_1$), and second power transferred per quadrant of steps ($Q_2$). The first quadrant stall power is a reference value of the stall power values 644. The first quadrant stall power represents the power transferred to the stepper motor 110 during a first quadrant of steps while in a stall condition. The second quadrant stall power is a reference value of the stall power values 644. The second quadrant stall power represents the power transferred to the stepper motor 110 during a second quadrant of steps while in the stall condition. The first power transferred per quadrant of steps represents a first determination of the power transferred per quadrant determination circuitry 684. The second power transferred per quadrant of steps represents a second determination of the power transferred per quadrant determination circuitry 684. The first determination corresponds to a first quadrant of steps followed by a second quadrant of steps corresponding to the second determination.

In some examples, the load angle determination circuitry 688 determines the load angle 435 by taking the arctangent of a difference between the first and second power transferred per quadrant of steps ($Q_1-Q_2$) minus a difference between the first and second quadrant stall power ($Q_{1\_STALL}-Q_{2\_STALL}$) divided by a subtraction of an addition of the first and second quadrant stall power ($Q_{1\_STALL}+Q_{2\_STALL}$) from an addition of the first and second power transferred per quadrant of steps ($Q_1+Q_2$). In such examples, the load angle determination circuitry 688 uses Equation (5), below, to determine the load angle 435.

$$\phi = \arctan\left(\frac{(Q_1 - Q_2) - (Q_{1\_STALL} - Q_{2\_STALL})}{(Q_1 + Q_2) - (Q_{1\_STALL} + Q_{2\_STALL})]*2/\pi}\right); \quad \text{Equation (5)}$$

The load angle determination circuitry 688 has an output coupled to the load determination circuitry 692. The load angle determination circuitry 688 supplies the load angle to the load determination circuitry 692. In some examples, the load angle determination circuitry 688 is instantiated by processor circuitry executing load angle determination instructions and/or other circuitry performing operations such as those represented by the flowchart of FIGS. 8A and 8B.

The load determination circuitry 692 has inputs coupled to the motor control characteristics 612 and the load angle determination circuitry 688. The load determination circuitry 692 receives the stall threshold value 648 from the motor control characteristics 612. The load determination circuitry 692 receives the load angle 435 from the load angle determination circuitry 688. The load determination circuitry 692 compares the load angle 435 to the stall threshold value 648. The load determination circuitry 692 determines the stepper motor is in the stall condition when the load angle 435 is less than or equal to the stall threshold value 648. The load determination circuitry 692 determines the stepper motor is not in the stall condition when the load angle 435 is greater than the stall threshold value 648. In some examples, the load determination circuitry 692 disables the controller circuitry 155 when the stepper motor 110 is determined to be in the stall condition. In some examples, the load determination circuitry 692 is instantiated by processor circuitry executing load determination instructions and/or other circuitry performing operations such as those represented by the flowchart of FIGS. 8A and 8B.

Figure 7:
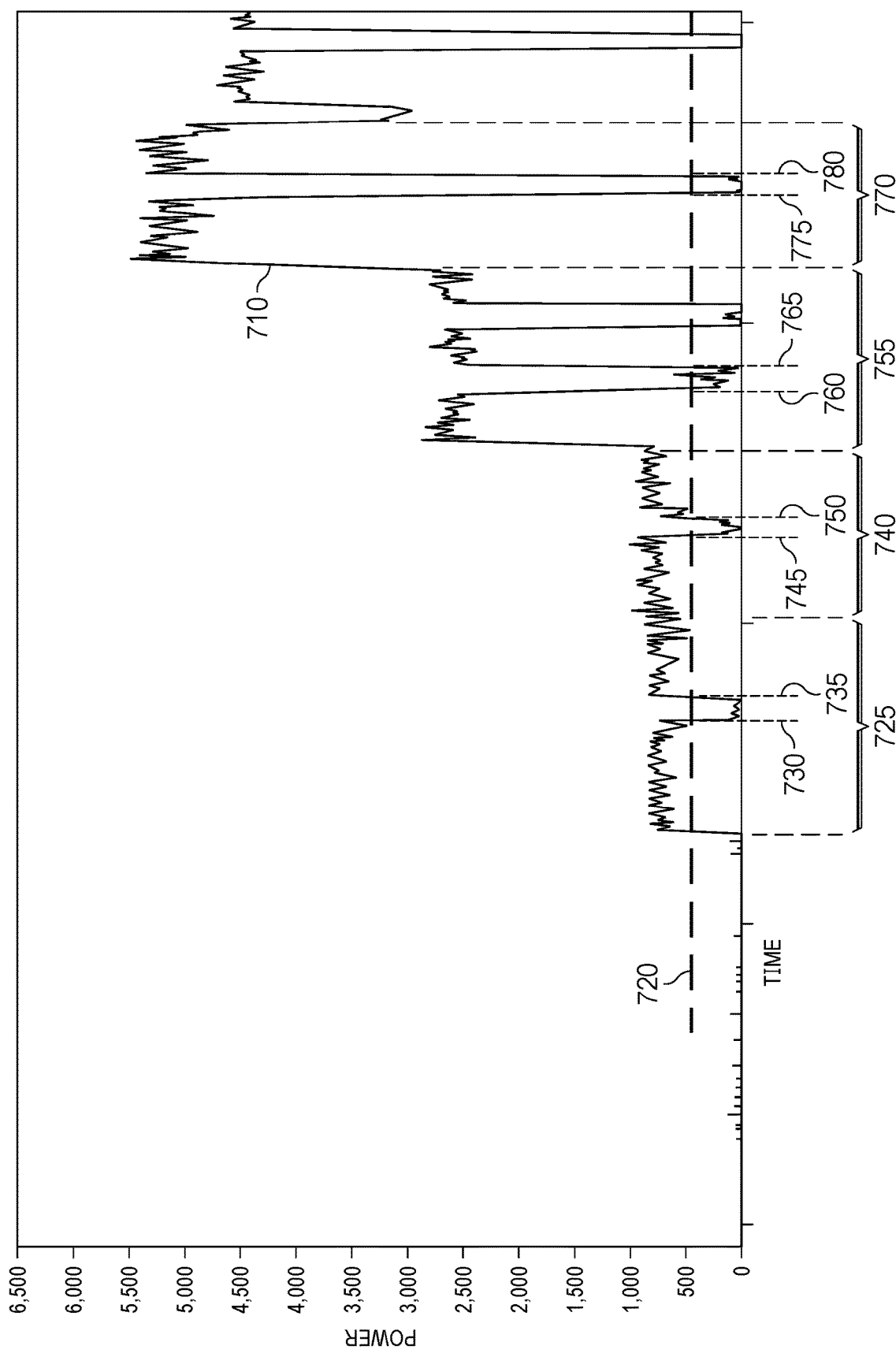
FIG. 7 is a timing diagram of an example operation of the power stall detection circuitry of FIG. 6.

FIG. 7 is a timing diagram 700 of examples operation of the power stall detection circuitry 165 of FIGS. 1, 2, and 6. In the example of FIG. 7, the timing diagram 700 illustrates an example power transferred difference 710 and an example stall threshold 720. The timing diagram 700 illustrates a difference between power transferred and the stall power values 644 of FIG. 6 across a plurality of operating conditions.

The power transferred difference 710 illustrates a difference between the power transferred per quadrant of steps from the power transferred per quadrant determination circuitry 684 and the stall power values 644. The stall threshold 720 is an illustrative representation of the stall threshold value 648 of FIG. 6. In example operation, the load determination circuitry 692 of FIG. 6 determines the stepper motor 110 of FIGS. 1 and 2 is in the stall condition when the power transferred difference 710 is approximately less than or equal to the stall threshold 720.

During a first example operation 725, the reference voltage terminal 305 of FIG. 3 is approximately equal to six volts (V). At a first time 730, the power transferred difference 710 is less than or equal to the stall threshold 720. At the first time 730 the load determination circuitry 692 determines the stepper motor 110 is in the stall condition. At a second time 735, the power transferred difference 710 is greater than the stall threshold 720. At the second time 735, the load determination circuitry 692 no longer determines the stepper motor 110 to be in the stall condition.

During a second example operation 740, the reference voltage terminal 305 is approximately equal to seven volts (V). At a third time 745, the power transferred difference 710 is less than or equal to the stall threshold 720. At the third time 745 the load determination circuitry 692 determines the stepper motor 110 is in the stall condition. At a fourth time 750, the power transferred difference 710 is greater than the stall threshold 720. At the fourth time 750, the load determination circuitry 692 no longer determines the stepper motor 110 to be in the stall condition.

During a third example operation 755, the reference voltage terminal 305 is approximately equal to nine volts (V). At a fifth time 760, the power transferred difference 710 is less than or equal to the stall threshold 720. At the fifth time 760 the load determination circuitry 692 determines the stepper motor 110 is in the stall condition. At a sixth time 765, the power transferred difference 710 is greater than the stall threshold 720. At the sixth time 765, the load determination circuitry 692 no longer determines the stepper motor 110 to be in the stall condition.

During a fourth example operation 770, the reference voltage terminal 305 is approximately equal to twelve volts (V). At a seventh time 775, the power transferred difference 710 is less than or equal to the stall threshold 720. At the seventh time 775 the load determination circuitry 692 determines the stepper motor 110 is in the stall condition. At an eighth time 780, the power transferred difference 710 is greater than the stall threshold 720. At the eighth time 780, the load determination circuitry 692 no longer determines the stepper motor 110 to be in the stall condition.

Advantageously, the stall threshold 720 may remain constant across a range of reference voltages. Advantageously, the power stall detection circuitry 165 of FIGS. 1, 2, and 6 accurately detects when the stepper motor 110 is in the stall condition. Advantageously, the power transferred to the stepper motor 110 allows the power stall detection circuitry 165 to differentiate between the stall condition and the no load condition.

Figure 8B:
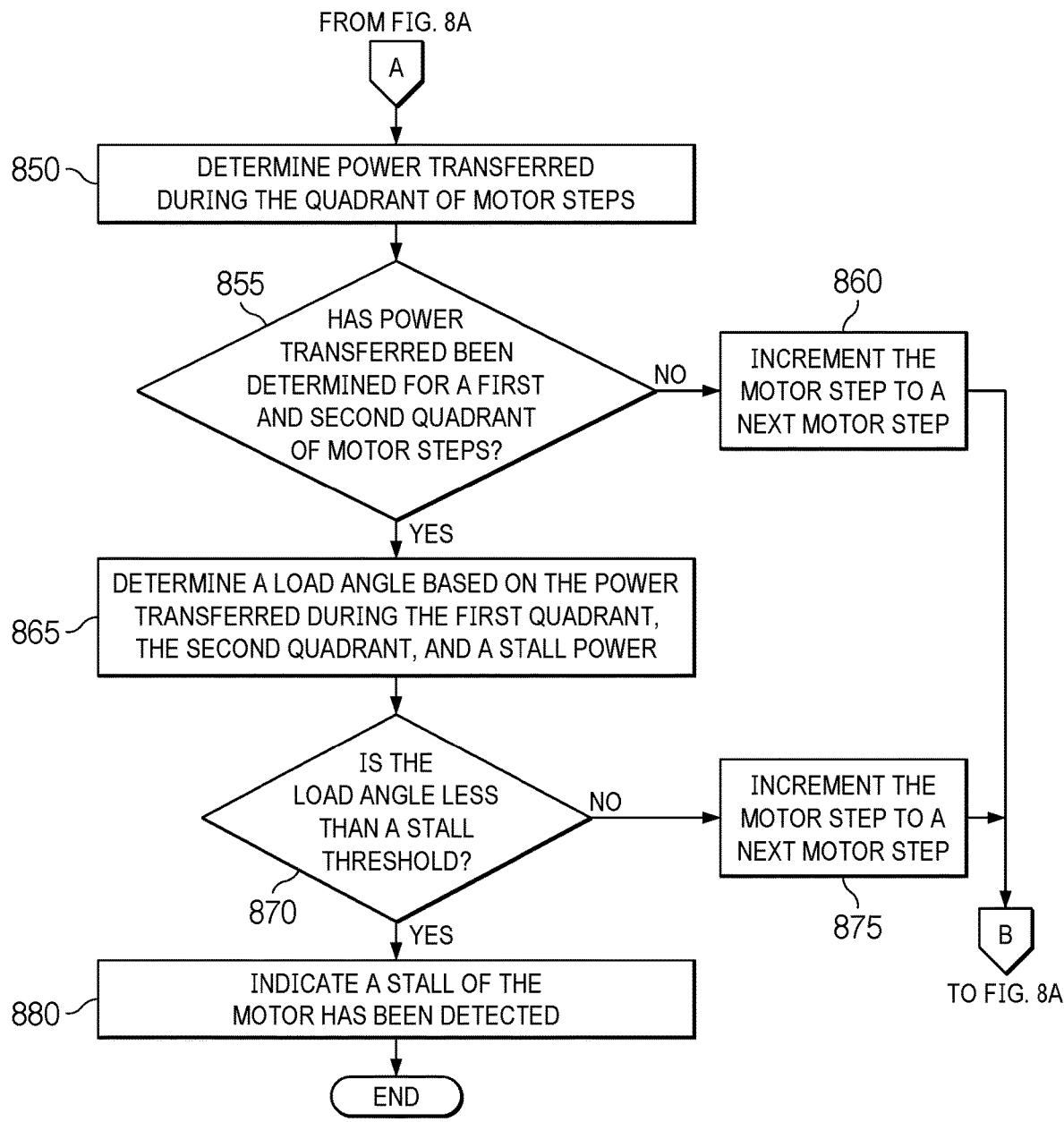

FIGS. 8A and 8B are a flowchart representative of example machine-readable instructions and/or example operations 800 that may be executed, instantiated, and/or performed by programmable circuitry and/or other hardware to determine when the stepper motor 110 of FIGS. 1 and 2 is in a stall condition using the controller circuitry 155 of FIGS. 1, 2, and 6. The example machine-readable instructions and/or the example operations 800 of FIGS. 8A and 8B begin at block 805, at which the step current determination circuitry 656 of FIG. 6 determines an indexer coefficient for a motor step. In some examples, the step current determination circuitry 656 determines the indexer coefficient using Equation (1), above.

The step current determination circuitry 656 determines a target current for the motor step based on the indexer coefficient. (Block 810). In some examples, the step current determination circuitry 656 determines the target current for the motor step using Equation (2), above.

The mode of operation determination circuitry 664 of FIG. 6 controls the current driver circuitry 150 of FIGS. 1-3 to achieve the current for the motor step. (Block 815). In some examples, the mode of operation determination circuitry 664 compares the target current from the step current determination circuitry 656 to the determined first current from the inductor current determination circuitry 660 of FIG. 6. In such examples, the mode of operation determination circuitry 664 selects one of the drive mode of operation, slow decay mode of operation, or a fast decay mode of operation based on the comparison. The mode of operation determination circuitry 664 supplies (or indicates) the selected mode of operation to the first drive operation control circuitry 620 to turn on and off transistors to implement the selected mode of operation.

The drive time counter 672 of FIG. 6 determines a first duration that the first current driver circuitry 150 was in a drive mode of operation during the motor step. (Block 820). In some examples, the drive time counter 672 determines an amount of time that the mode of operation determination circuitry 664 configures the first current driver circuitry 150 to the drive mode of operation for a motor step. In such examples, the drive time counter 672 resets after a rising edge of the step pulse train from the step incrementor 608 of FIG. 6.

The fast decay time counter 676 of FIG. 6 determines a second duration that the first current driver circuitry 150 was in a fast decay mode of operation during the motor step. (Block 825). In some examples, the fast decay time counter 676 determines an amount of time that the mode of operation determination circuitry 664 configures the first current driver circuitry 150 to the fast decay mode of operation for a motor step. In such examples, the fast decay time counter 676 resets after a rising edge of the step pulse train from the step incrementor 608.

The step time counter 668 of FIG. 6 determines the step duration. (Block 830). In some examples, the step time counter 668 determines a duration of a motor step. In such examples, the step time counter 668 resets after a rising edge of the step pulse train from the step incrementor 608. In some examples, the duration of a motor step may be included in the motor control characteristics 612 of FIG. 6.

The power transferred per step determination circuitry 680 of FIG. 6 determines power transferred by the first current driver circuitry 150 during the motor step. (Block 835). In some examples, the power transferred per step determination circuitry 680 determines the power transferred for the motor step using Equation (3), above.

The power transferred per quadrant determination circuitry 684 of FIG. 6 determines if power transferred has been determined for a quadrant of motor steps. (Block 840). In some examples, the power transferred per quadrant determination circuitry 684 compares the value of the current step from the step tracker circuitry 652 of FIG. 6 to the number of steps in a quadrant value 632 of FIG. 6. In such examples, the power transferred per quadrant determination circuitry 684 determines a quadrant of steps have occurred when the value of the current step is equal to the number of steps in a quadrant value 632. In other examples, the power transferred per quadrant determination circuitry 684 determines if a quadrant of motor steps have occurred based on a number of step power calculations compared to the number of steps in a quadrant value 632.

If the power transferred per quadrant determination circuitry 684 determines power transferred has not been determined for a quadrant of motor steps (e.g., Block 840 returns a result of NO), the step incrementor 608 increments the motor step to a next motor step. (Block 845). In some examples, the step incrementor 608 generates a pulse on the step pulse train 430 of FIG. 4. In such examples, responsive to the pulse, the step tracker circuitry 652 increments the current step to a subsequent step. Control proceeds to return to Block 805 with the next motor step.

Turning now to FIG. 8B. If the power transferred per quadrant determination circuitry 684 determines power transferred has been determined for a quadrant of motor steps (e.g., Block 840 returns a result of YES), the power transferred per quadrant determination circuitry 684 determines power transferred during the quadrant of motor steps. (Block 850). In some examples, the power transferred per quadrant determination circuitry 684 determines the power transferred during the quadrant of motor steps using Equation (4), above.

The load angle determination circuitry 688 of FIG. 6 determines if power transferred has been determined for a first and second quadrants of motor steps. (Block 855). In some examples, the load angle determination circuitry 688 determines power for a plurality of quadrants of motor steps. In such examples, the power transferred per quadrant determination circuitry 684 determines power transferred for two subsequent quadrants of motor steps.

If the load angle determination circuitry 688 determines that power transferred has not been determined for a first and second quadrants of motor steps (e.g., Block 855 returns a result of NO), the step incrementor 608 increments the motor step to a next motor step. (Block 860). In some examples, the step incrementor 608 generates a pulse on the step pulse train 430. In such examples, responsive to the pulse, the step tracker circuitry 652 increments the current step to a subsequent step. Control proceeds to return to Block 805 with the next motor step.

If the load angle determination circuitry 688 determines that power transferred has been determined for a first and second quadrants of motor steps (e.g., Block 855 returns a result of YES), control proceeds to Block 865. The load angle determination circuitry 688 determines the load angle 435 of FIG. 4 based on the power transferred during the first and second quadrants, and the stall power values 644 of FIG. 6. (Block 865). In some examples, the load angle determination circuitry 688 determines the load angle 435 using Equation (5), above.

The load determination circuitry 692 determines if the load angle 435 is less than the stall threshold value 648 of FIG. 6. (Block 870). In some examples, the load determination circuitry 692 compares the load angle 435 to the stall threshold value 648.

If the load determination circuitry 692 determines the load angle 435 is greater than the stall threshold value 648 (e.g., Block 870 returns a result of NO), the step incrementor 608 increments the motor step to a next motor step. (Block 875). In some examples, the step incrementor 608 generates a pulse on the step pulse train 430. In such examples, responsive to the pulse, the step tracker circuitry 652 increments the current step to a subsequent step. Control proceeds to return to Block 805 with the next motor step.

If the load determination circuitry 692 determines the load angle 435 is less than the stall threshold value 648 (e.g., Block 870 returns a result of YES), the load determination circuitry 692 indicates a stall operation of the stepper motor 110 has been detected. (Block 880). Control proceeds to end.

Although example processes are described with reference to the flowchart illustrated in FIGS. 8A and 8B, many other methods of determining a stall operation of the stepper motor 110 may alternatively be used in accordance with teachings of this disclosure. For example, the order of execution of the blocks may be changed, and/or some of the blocks described may be changed, eliminated, or combined. Similarly, additional operations may be included in the manufacturing process before, in between, or after the blocks shown in the illustrated examples.

While an example manner of implementing the controller circuitry 155 of FIGS. 1, 2, and 6 is illustrated in FIG. 6, one or more of the elements, processes, and/or devices illustrated in FIG. 6 may be combined, divided, re-arranged, omitted, eliminated, and/or implemented in any other way. Further, the power stall detection circuitry 165, the clock circuitry 604, the step incrementor 608, the motor control characteristics 612, the first current driver control circuitry 616, the first drive operation control circuitry 620, the second current driver control circuitry 624, and the second drive operation control circuitry 628, and/or, more generally, the example controller circuitry 155 of FIG. 6, may be implemented by hardware alone or by hardware in combination with software and/or firmware. Thus, for example, any of the power stall detection circuitry 165, the clock circuitry 604, the step incrementor 608, the motor control characteristics 612, the first current driver control circuitry 616, the first drive operation control circuitry 620, the second current driver control circuitry 624, and the second drive operation control circuitry 628, and/or, more generally, the example controller circuitry 155, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller circuitry 155 of FIG. 6 may include one or more elements, processes, and/or devices in addition to, or instead of, those illustrated in FIG. 6, and/or may include more than one of any or all of the illustrated elements, processes and devices.

Flowchart(s) representative of example machine-readable instructions, which may be executed by programmable circuitry to implement and/or instantiate the controller circuitry 155 of FIG. 6 and/or representative of example operations which may be performed by programmable circuitry to implement and/or instantiate the controller circuitry 155 of FIG. 6, are shown in FIGS. 8A and 8B. The machine-readable instructions may be one or more executable programs or portion(s) of one or more executable programs for execution by programmable circuitry such as the programmable circuitry 912 shown in the example processor platform 900 described below in connection with FIG. 9 and/or may be one or more function(s) or portion(s) of functions to be performed by the example programmable circuitry (e.g., an FPGA) described below in connection with FIGS. 10 and/or 11. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 8A and 8B, many other methods of implementing the example controller circuitry 155 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 8A and 8B may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A. (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, or (3) at least one A and at least one B.

As used herein, singular references (e.g., "a." "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
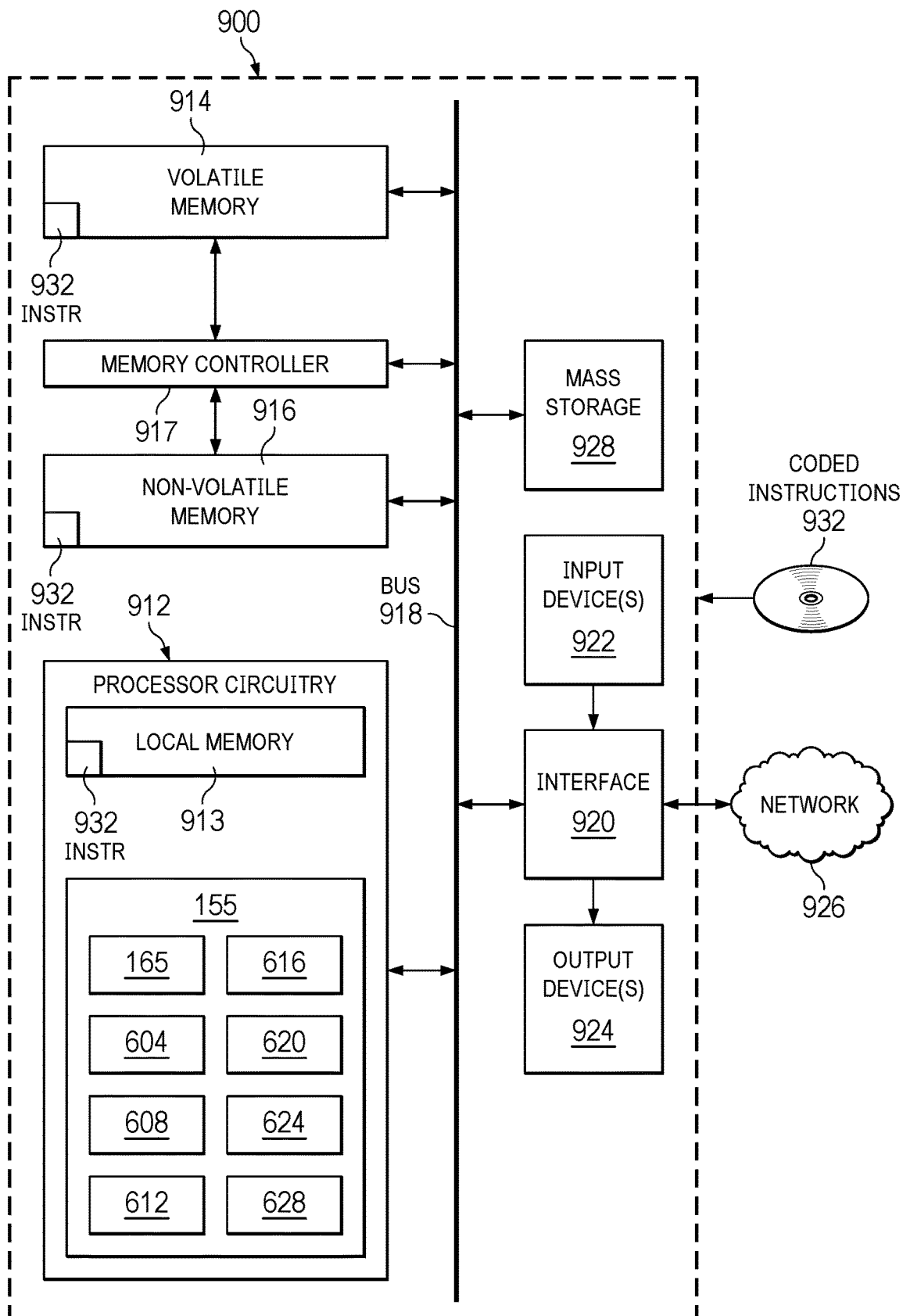
FIG. 9 is a block diagram of an example processing platform including programmable circuitry structured to execute, instantiate, and/or perform the example machine-readable instructions and/or perform the example operations of FIGS. 8A and 8B to implement the controller circuitry of FIG. 6.

FIG. 9 is a block diagram of an example programmable circuitry platform 900 structured to execute and/or instantiate the example machine-readable instructions and/or the example operations of FIGS. 8A and 8B to implement the controller circuitry 155 of FIG. 6. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a personal video recorder, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the power stall detection circuitry 165, the clock circuitry 604, the step incrementor 608, the motor control characteristics 612, the first current driver control circuitry 616, the first drive operation control circuitry 620, the second current driver control circuitry 624, and the second drive operation control circuitry 628, and/or more generally the controller circuitry 155.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device.

Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 932, which may be implemented by the machine-readable instructions of FIGS. 8A and 8B, may be stored in the mass storage device 928, in the volatile memory 914, in the non-volatile memory 916, and/or on at least one non-transitory computer readable storage medium such as a CD or DVD which may be removable.

Figure 10:
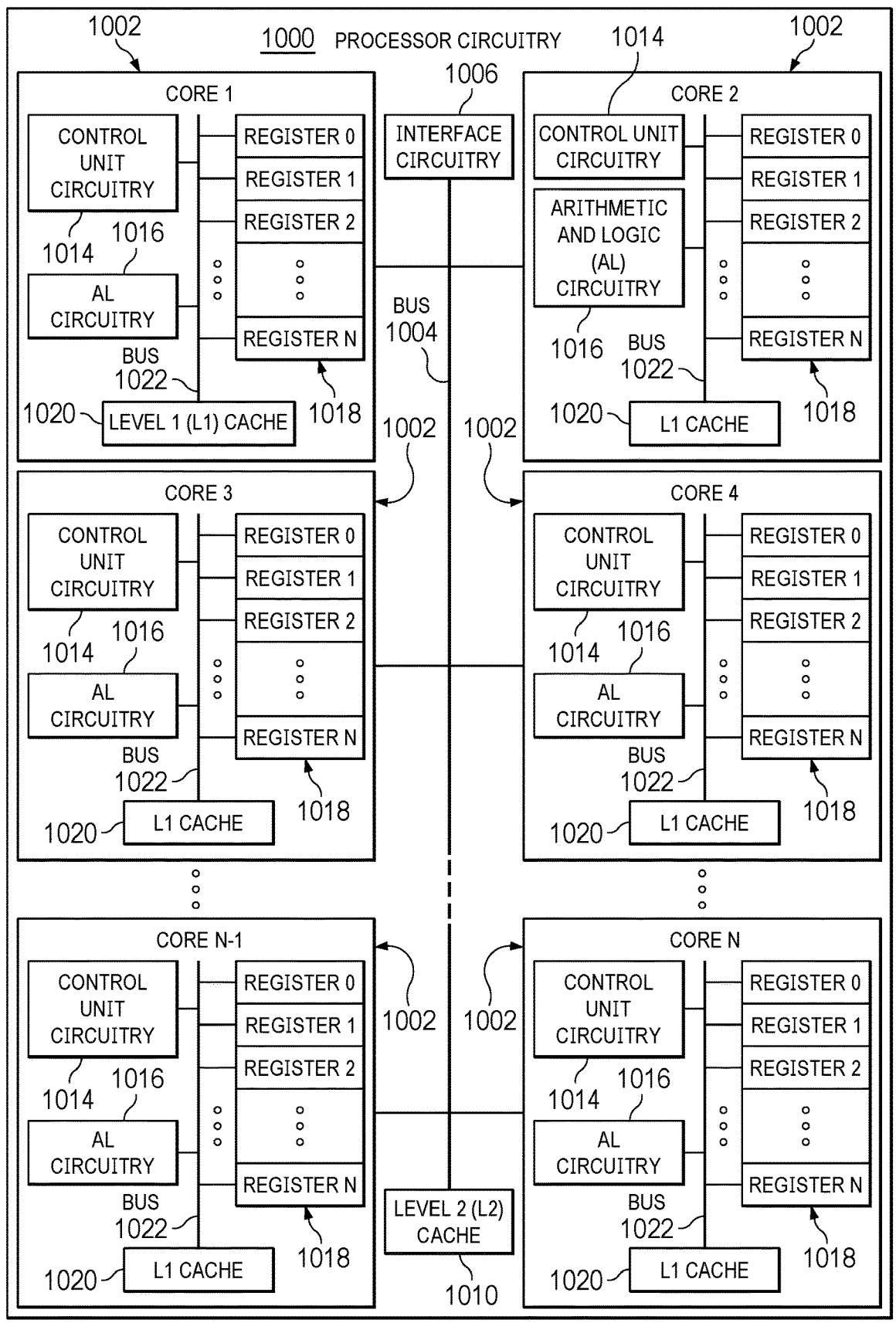
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 8A and 8B to effectively instantiate the circuitry of FIG. 2 as logic circuits to perform operations corresponding to those machine-readable instructions. In some such examples, the circuitry of FIG. 6 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 8A and 8B.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer-based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those described herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
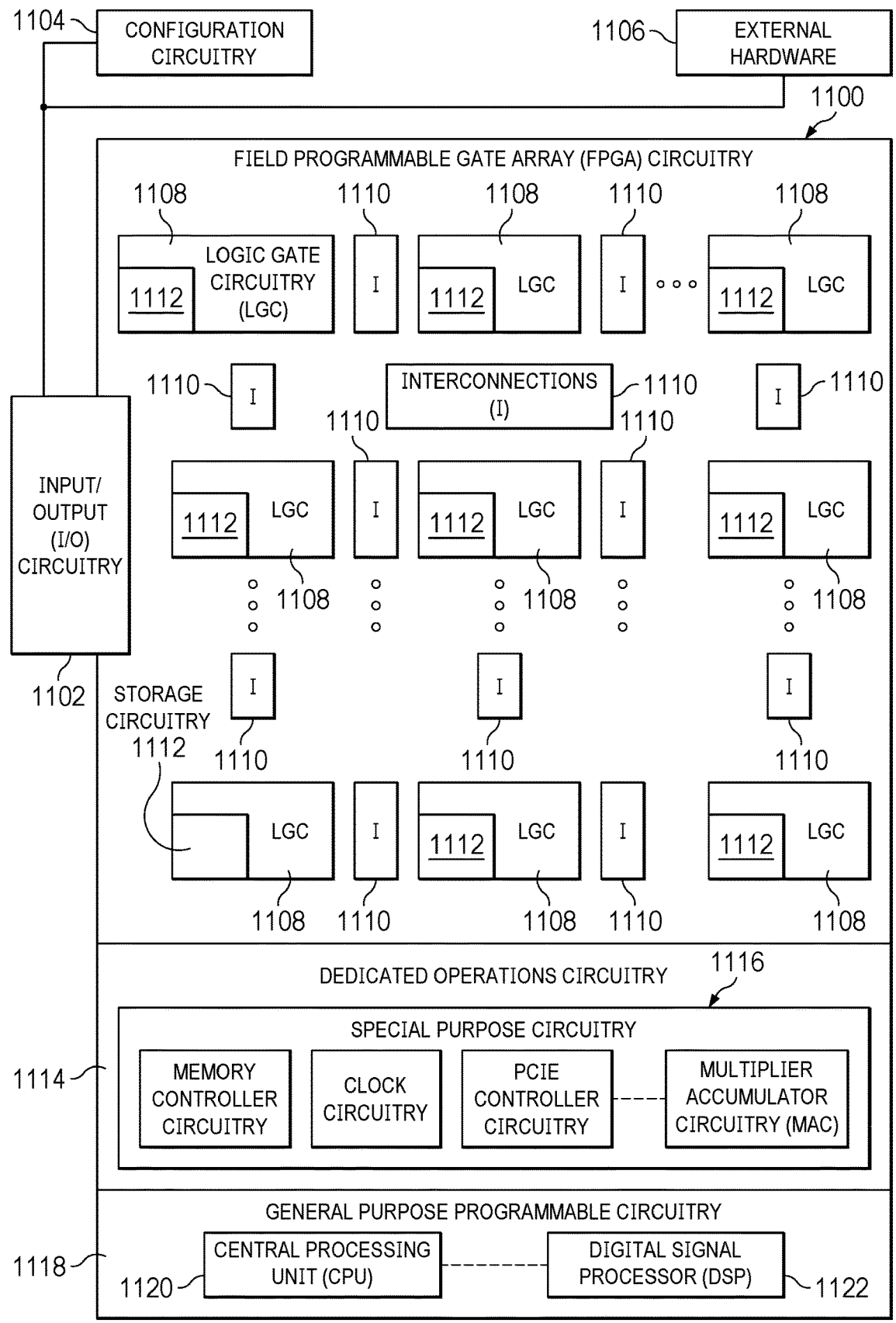
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine-readable instructions represented by the flowchart (s) of FIGS. 8A and 8B but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 8A and 8B. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 8A and 8B. As such, the FPGA circuitry 1100 may be configured and/or structured to effectively instantiate some or all of the operations/functions corresponding to the machine-readable instructions of the flowchart(s) of FIGS. 8A and 8B as dedicated logic circuits to perform the operations/functions corresponding to those software instructions in a dedicated manner analogous to an ASIC. Therefore, the FPGA circuitry 1100 may perform the operations/functions corresponding to the some or all of the machine-readable instructions of FIGS. 8A and 8B faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine-readable instructions of FIGS. 8A and 8B and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine-readable instructions represented by the flowchart(s) of FIGS. 8A and 8B to perform first operation(s)/function(s), the FPGA circuitry 1100 of FIG. 11 may be configured and/or structured to perform second operation(s)/function(s) corresponding to a second portion of the machine-readable instructions represented by the flowcharts of FIGS. 8A and 8B, and/or an ASIC may be configured and/or structured to perform third operation(s)/function(s) corresponding to a third portion of the machine-readable instructions represented by the flowcharts of FIGS. 8A and 8B.

It should be understood that some or all of the circuitry of FIG. 6 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIG. 6 may be instantiated, for example, in one or more threads executing concurrently and/or in series. For example, the microprocessor 1000 of FIG. 10 may execute machine-readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIG. 6 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

In this description, the term "and/or" (when used in a form such as A, B and/or C) refers to any combination or subset of A, B, C, such as: (a) A alone; (b) B alone; (c) C alone; (d) A with B; (c) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

Numerical identifiers such as "first," "second," "third," etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that detect a stall of a stepper motor. Described systems, apparatus, articles of manufacture, and methods improve the efficiency of using a computing device by detecting a stall operation of a stepper motor without additional sensing circuitry. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
    memory including machine-readable instructions;
    programmable circuitry configured to execute the machine-readable instructions, the machine-readable instructions to cause the programmable circuitry to at least:
        determine a first value of power transferred to a stepper motor during a first operation of the stepper motor;
        determine a second value of power transferred to the stepper motor during a second operation of the stepper motor;
        determine a load angle of power delivered by the stepper motor during the first operation and second operation of the stepper motor based on the first value, the second value, and a stall power; and compare the load angle to a stall threshold to detect a stall of the stepper motor.

2. The apparatus of claim 1, wherein the first operation of the stepper motor includes a plurality of steps, the programmable circuitry is configured to:
   determine a current for a step of the plurality of steps of the first operation; and
   control a mode of operation of a current driver to achieve the current for the step of the plurality of steps, the mode of operation of the current driver being one of a drive mode, a first decay mode, or a second decay mode.

3. The apparatus of claim 1, wherein the programmable circuitry is configured to determine the first value of power transferred during the first operation of the stepper motor by adding values of power transferred during steps of the stepper motor during the first operation of the stepper motor, the first operation of the stepper motor being a quadrant of steps.

4. The apparatus of claim 1, wherein the programmable circuitry is configured to determine a third value of power delivered during a step of the first operation of the stepper motor based on a supply voltage, a peak current, an indexer coefficient, a first duration of the step, a second duration that a current driver is in a drive mode of operation, and a third duration that the current driver is in a decay mode of operation.

5. The apparatus of claim 1, wherein the programmable circuitry is configured to determine an indexer coefficient for steps of the first operation of the stepper motor based on a number of steps in the first operation of the stepper motor and a number of a step of the first operation of the stepper motor.

6. The apparatus of claim 1, wherein the programmable circuitry is configured to:
   determine a first difference between the first value and the second value;
   determine a second difference between the first difference and a third difference between power delivered during a stall of the stepper motor;
   determine a first total power delivered by adding the first value and the second value; and
   determine a fourth difference between the first total power delivered and a second power delivered during the stall of the stepper motor.

7. The apparatus of claim 6, wherein the programmable circuitry is configured to:
   determine a third value as a division of the second difference by a multiplication of the fourth difference times a division of pi by two; and
   determine the load angle as an arctangent of the third value.

8. At least one non-transitory computer readable storage medium comprising instructions that, when executed, cause programmable circuitry to at least:
   determine a first value of power transferred to a stepper motor during a first operation of the stepper motor;
   determine a second value of power transferred to the stepper motor during a second operation of the stepper motor;
   determine a load angle of power delivered by the stepper motor during the first operation and second operation of the stepper motor based on the first value, the second value, and a stall power; and
   compare the load angle to a stall threshold to detect a stall of the stepper motor.

9. The at least one non-transitory computer readable storage medium of claim 8, wherein the first operation of the stepper motor includes a plurality of steps, the instructions are to cause the programmable circuitry to:
   determine a current for a step of the plurality of steps of the first operation; and
   control a mode of operation of a current driver to achieve the current for the step of the plurality of steps, the mode of operation of the current driver being one of a drive mode, a first decay mode, or a second decay mode.

10. The at least one non-transitory computer readable storage medium of claim 8, wherein the instructions are to cause the programmable circuitry to determine the first value of power transferred during the first operation of the stepper motor by adding values of power transferred during steps of the stepper motor during the first operation of the stepper motor, the first operation of the stepper motor being a quadrant of steps.

11. The at least one non-transitory computer readable storage medium of claim 8, wherein the instructions are to cause the programmable circuitry to determine a third value of power delivered during a step of the first operation of the stepper motor based on a supply voltage, a peak current, an indexer coefficient, a first duration of the step, a second duration that a current driver is in a drive mode of operation, and a third duration that the current driver is in a decay mode of operation.

12. The at least one non-transitory computer readable storage medium of claim 8, wherein the instructions are to cause the programmable circuitry to determine an indexer coefficient for steps of the first operation of the stepper motor based on a number of steps in the first operation of the stepper motor and a number of a step of the first operation of the stepper motor.

13. The at least one non-transitory computer readable storage medium of claim 8, wherein the instructions are to cause the programmable circuitry to:
   determine a first difference between the first value and the second value;
   determine a second difference between the first difference and a third difference between power delivered during a stall of the stepper motor;
   determine a first total power delivered by adding the first value and the second value; and
   determine a fourth difference between the first total power delivered and a second power delivered during the stall of the stepper motor.

14. The at least one non-transitory computer readable storage medium of claim 13, wherein the instructions are to cause the programmable circuitry to:
   determine a third value as a division of the second difference by a multiplication of the fourth difference times a division of two by pi; and
   determine the load angle as an arctangent of the third value.

15. A method comprising:
   determining a first value of power transferred to a stepper motor during a first operation of the stepper motor;
   determining a second value of power transferred to the stepper motor during a second operation of the stepper motor;
   determining a load angle of power delivered by the stepper motor during the first operation and second operation of the stepper motor based on the first value, the second value, and a stall power; and comparing the load angle to a stall threshold to detect a stall of the stepper motor.

16. The method of claim 15, further including determining the first value of power transferred during the first operation of the stepper motor by adding values of power transferred during steps of the stepper motor during the first operation of the stepper motor, the first operation of the stepper motor being a quadrant of steps.

17. The method of claim 15, further including determining a third value of power delivered during a step of the first operation of the stepper motor based on a supply voltage, a peak current, an indexer coefficient, a first duration of the step, a second duration that a current driver is in a drive mode of operation, and a third duration that the current driver is in a decay mode of operation.

18. The method of claim 15, further including determining an indexer coefficient for steps of the first operation of the stepper motor based on a number of steps in the first operation of the stepper motor and a number of a step of the first operation of the stepper motor.

19. The method of claim 15, further including:
  determining a first difference between the first value and the second value;
  determining a second difference between the first difference and a third difference between power delivered during a stall of the stepper motor;
  determining a first total power delivered by adding the first value and the second value; and
  determining a fourth difference between the first total power delivered and a second power delivered during the stall of the stepper motor.

20. The method of claim 19, further including:
  determining a third value as a division of the second difference by a multiplication of the fourth difference times a division of two by pi; and
  determining the load angle as an arctangent of the third value.

* * * * *